US012761661B2

(12) United States Patent
Li et al.

(10) Patent No.: US 12,761,661 B2
(45) Date of Patent: Oct. 13, 2026

(54) METHOD AND APPARATUS FOR CONTROLLING MOVABLE PLATFORM, AND MOVABLE PLATFORM AND STORAGE MEDIUM

(71) Applicant: SZ DJI TECHNOLOGY CO., LTD., Shenzhen (CN)

(72) Inventors: Yuanhong Li, Shenzhen (CN); Zezao Lu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/650,825

(22) Filed: Apr. 30, 2024

(65) Prior Publication Data

US 2024/0288877 A1 Aug. 29, 2024

Related U.S. Application Data

(63) Continuation of application No. PCT/CN2021/128068, filed on Nov. 2, 2021.

(51) Int. Cl.
*G05D 1/49* (2024.01)
*G05D 1/689* (2024.01)
(Continued)

(52) U.S. Cl.
CPC ............... *G05D 1/49* (2024.01); *G05D 1/689* (2024.01); *G05D 2105/80* (2024.01); *G05D 2109/20* (2024.01)

(58) Field of Classification Search
CPC ...... G05D 1/49; G05D 1/689; G05D 2109/20; G05D 2105/80
See application file for complete search history.

(56) References Cited

U.S. PATENT DOCUMENTS 5,964,822 A 10/1999 Alland et al.
8,738,235 B2 * 5/2014 Laliron .................... B60Q 1/12 362/469
(Continued)

FOREIGN PATENT DOCUMENTS

CN 104699104 A 6/2015
CN 105223859 A 1/2016
(Continued)

OTHER PUBLICATIONS

The World Intellectual Property Organization (WIPO) International Search Report for PCT/CN2021/128068 Aug. 2, 2022 5 Pages (including translation).

*Primary Examiner* — Dale W Hilgendorf
*Assistant Examiner* — Hana Lee
(74) *Attorney, Agent, or Firm* — Anova Law Group, PLLC

(57) ABSTRACT

A method for controlling a movable platform includes obtaining a trajectory of the movable platform and controlling the movable platform to move along the trajectory, obtaining a reference sensing orientation of a sensing apparatus of the movable platform, and adjusting the sensing orientation of the sensing apparatus from the reference sensing orientation to a target sensing orientation. When a sensing orientation of the sensing apparatus is the reference sensing orientation, first one or more trajectory points between a current location of the movable platform and a first location are within a sensing range of the sensing apparatus, and second one or more trajectory points after the first location are outside the sensing range of the sensing apparatus. When the sensing orientation of the sensing apparatus is the target sensing orientation, the first one or more trajectory points and the second one or more trajectory points are within the sensing range.

17 Claims, 11 Drawing Sheets

(51) Int. Cl.
*G05D 105/80* (2024.01)
*G05D 109/20* (2024.01)

(56) References Cited

U.S. PATENT DOCUMENTS

| | | | | |
|---|---|---|---|---|
| 9,760,092 | B2 * | 9/2017 | Ferguson | G05D 1/2437 |
| 2017/0242445 | A1 * | 8/2017 | Stathis | G08G 5/55 |
| 2017/0299707 | A1 * | 10/2017 | Nguyen | B60T 7/12 |
| 2018/0194344 | A1 * | 7/2018 | Wang | G05D 1/027 |
| 2020/0174469 | A1 * | 6/2020 | Trumpore | G08G 1/096791 |
| 2020/0283023 | A1 * | 9/2020 | Lally | B60W 60/0025 |
| 2021/0125507 | A1 * | 4/2021 | Haider | G08G 5/26 |
| 2021/0300440 | A1 | 9/2021 | Sindhuja et al. | |

FOREIGN PATENT DOCUMENTS

| | | | |
|---|---|---|---|
| CN | 206993294 | U | 2/2018 |
| CN | 109976387 | A | 7/2019 |
| CN | 112119361 | A | 12/2020 |
| CN | 112540625 | A | 3/2021 |
| JP | 2004209562 | A | 7/2004 |
| JP | 2016131367 | A | 7/2016 |

* cited by examiner

METHOD AND APPARATUS FOR CONTROLLING MOVABLE PLATFORM, AND MOVABLE PLATFORM AND STORAGE MEDIUM

CROSS-REFERENCE TO RELATED APPLICATION

This application is a continuation of International Application No. PCT/CN2021/128068, filed Nov. 2, 2021, the entire content of which is incorporated herein by reference.

TECHNICAL FIELD

The present disclosure relates to the movable platform technology field and, more particularly, to a method and an apparatus for controlling a movable platform, the movable platform, and a storage medium.

BACKGROUND

A sensing apparatus configured to detect a surrounding environment is arranged at a movable platform (e.g., an unmanned aerial vehicle). When the movable platform moves autonomously along a route, the sensing apparatus can detect the environment around the movable platform. Currently, during the movement of the movable platform along the route, an orientation of the sensing apparatus is controlled in response to a user command. In some situations, the sensing orientation of the sensing apparatus is controlled based on the velocity direction of the movable platform. In some scenarios, it is desired that the sensing apparatus is able to observe the environment of an upcoming segment of a route that the movable platform is going to reach in the near future. However, in the existing technology, control of the sensing orientation of the sensing apparatus during the movement of the movable platform along the route does not meet the above requirement.

SUMMARY

In accordance with the disclosure, there is provided a method for controlling a movable platform. The method includes obtaining a trajectory of the movable platform and controlling the movable platform to move along the trajectory, obtaining a reference sensing orientation of a sensing apparatus of the movable platform, and adjusting the sensing orientation of the sensing apparatus from the reference sensing orientation to a target sensing orientation. When a sensing orientation of the sensing apparatus is the reference sensing orientation, first one or more trajectory points between a current location of the movable platform and a first location are within a sensing range of the sensing apparatus, and second one or more trajectory points after the first location are outside the sensing range of the sensing apparatus. When the sensing orientation of the sensing apparatus is the target sensing orientation, the first one or more trajectory points and the second one or more trajectory points are within the sensing range of the sensing apparatus.

Also in accordance with the disclosure, there is provided a method for controlling a movable platform. The method includes obtaining a trajectory of the movable platform, controlling the movable platform to move along the trajectory, and during movement of the movable platform along the trajectory, in response to a first trajectory segment starting from a current location of the movable platform and a second trajectory segment after the first trajectory segment being not on a same straight line, adjusting a sensing orientation of a sensing apparatus of the movable platform to a target sensing orientation. All of trajectory points on the first trajectory segment and at least some of trajectory points on the second trajectory segment are within a sensing range of the sensing apparatus.

Also in accordance with the disclosure, there is provided a control apparatus of a movable platform, including one or more processors and one or more memories. The one or more memories store a computer program that, when executed by the one or more processors, causes the one or more processors to obtain a trajectory of the movable platform and controlling the movable platform to move along the trajectory, obtain a reference sensing orientation of a sensing apparatus of the movable platform, and adjust the sensing orientation of the sensing apparatus from the reference sensing orientation to a target sensing orientation. When a sensing orientation of the sensing apparatus is the reference sensing orientation, first one or more trajectory points between a current location of the movable platform and a first location are within a sensing range of the sensing apparatus, and second one or more trajectory points after the first location are outside the sensing range of the sensing apparatus. When the sensing orientation of the sensing apparatus is the target sensing orientation, the first one or more trajectory points and the second one or more trajectory points are within the sensing range of the sensing apparatus.

DETAILED DESCRIPTION OF THE EMBODIMENTS

To make the purpose, technical solution, and advantages of embodiments of the present disclosure clearer, the technical solution of embodiments of the present disclosure is described in detail below in conjunction with the accompanying drawings. Described embodiments are some embodiments of the present disclosure, not all the embodiments. Based on embodiments of the present disclosure, all other embodiments obtained by those skilled in the art without creative efforts are within the scope of the present disclosure.

Unless otherwise defined, all technical and scientific terms used in the specification have the same meanings as those commonly understood by those skilled in the art. The terms used in the specification of the present disclosure are merely used to describe specific embodiments and are not intended to limit the present disclosure.

To understand a specific implementation process of the technical solution of embodiments of the present disclosure, the relevant technology is briefly described below. For example, a movable platform can include an unmanned aerial vehicle (UAV). A sensing apparatus can be arranged at the UAV to detect the surrounding environment. A method for controlling the sensing apparatus can include the following methods.

Heading Control Based on Joystick Value

Figure 1:
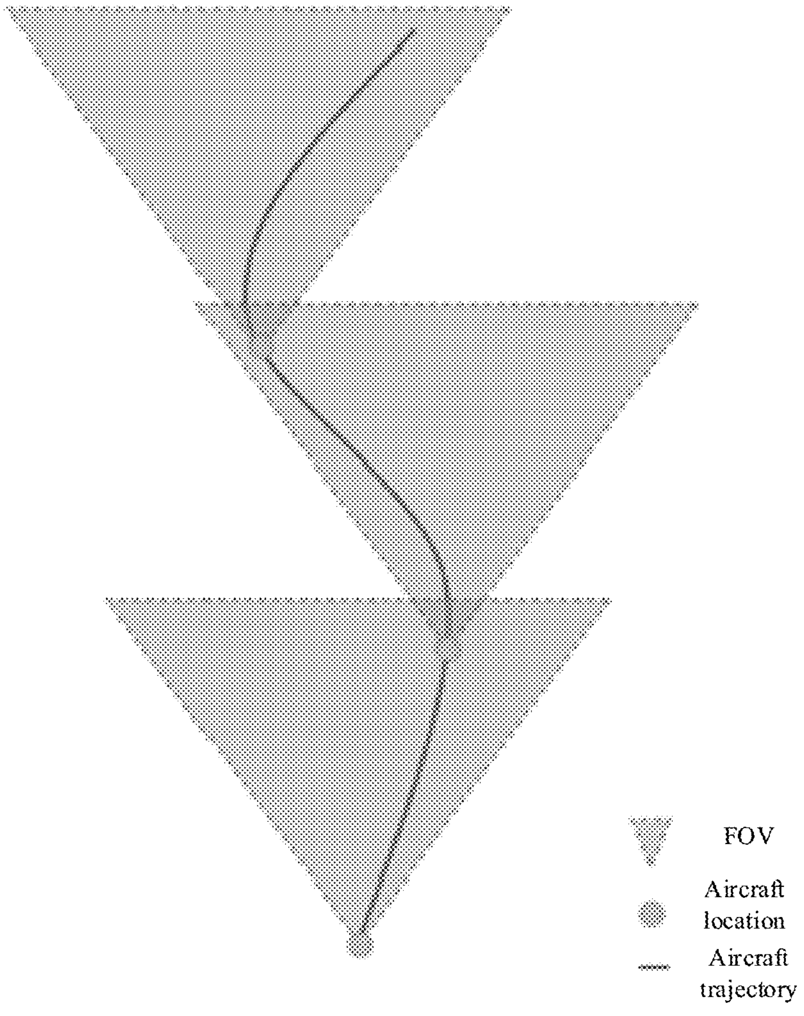
FIG. 1 is a schematic diagram showing performing heading control based on a joystick value consistent with an embodiment of the present disclosure.

The UAV can be communicatively connected to a remote controller. A joystick (P mode) can be arranged at the remote controller. When a user does not input a joystick value for a yaw axis through the remote controller, the sensing apparatus of the UAV can keep the current heading. As shown in FIG. 1, a top view of the sensing apparatus is illustrated. The UAV can be controlled to fly along a determined route through a joystick operation of the remote controller. During the flight of the UAV, the joystick value corresponding to the yaw axis is 0. Then, the UAV can realize a flying-around operation, and the heading of the sensing apparatus of the UAV can remain unchanged. The heading of the sensing apparatus can be controlled according to user intention in the above heading control method. The control purpose and action are clear. However, the following disadvantages can exist. Since the heading of the sensing apparatus needs to be controlled by the joystick operation, the above control method is not suitable for an automatic task. Meanwhile, for the route of the UAV, with the heading of the sensing apparatus, the route range that can be observed can be short. Thus, the UAV can have a collision risk.

Heading Control Based on a Target Point

Figure 2:
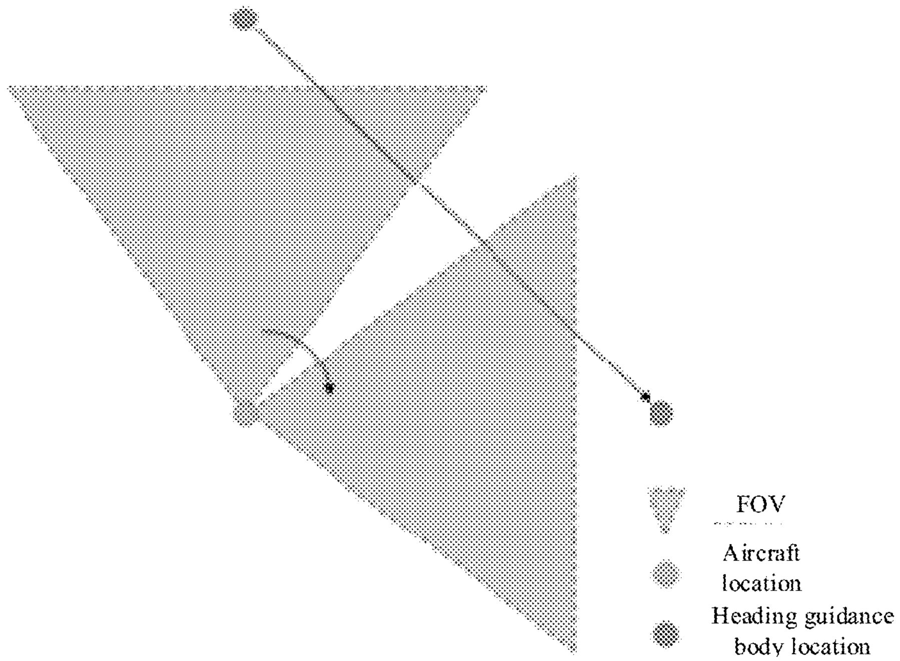
FIG. 2 is a schematic diagram showing performing heading control based on a target point consistent with an embodiment of the present disclosure.

The sensing apparatus can perform a route guide operation through a body (i.e., the target point), for example, an intelligent following operation. As shown in FIG. 2, a top view of the sensing apparatus is illustrated. Since the angle of view (also referred to as "field of view," FOV) of the sensing apparatus can change as the location of the guide body changes. Thus, the guide body is usually located at or close to an image center of the sensing apparatus or at a location calculated according to a certain image configuration rule. Such a route control method requires a body to guide the route and is not suitable for a task without a guide body.

Figure 3:
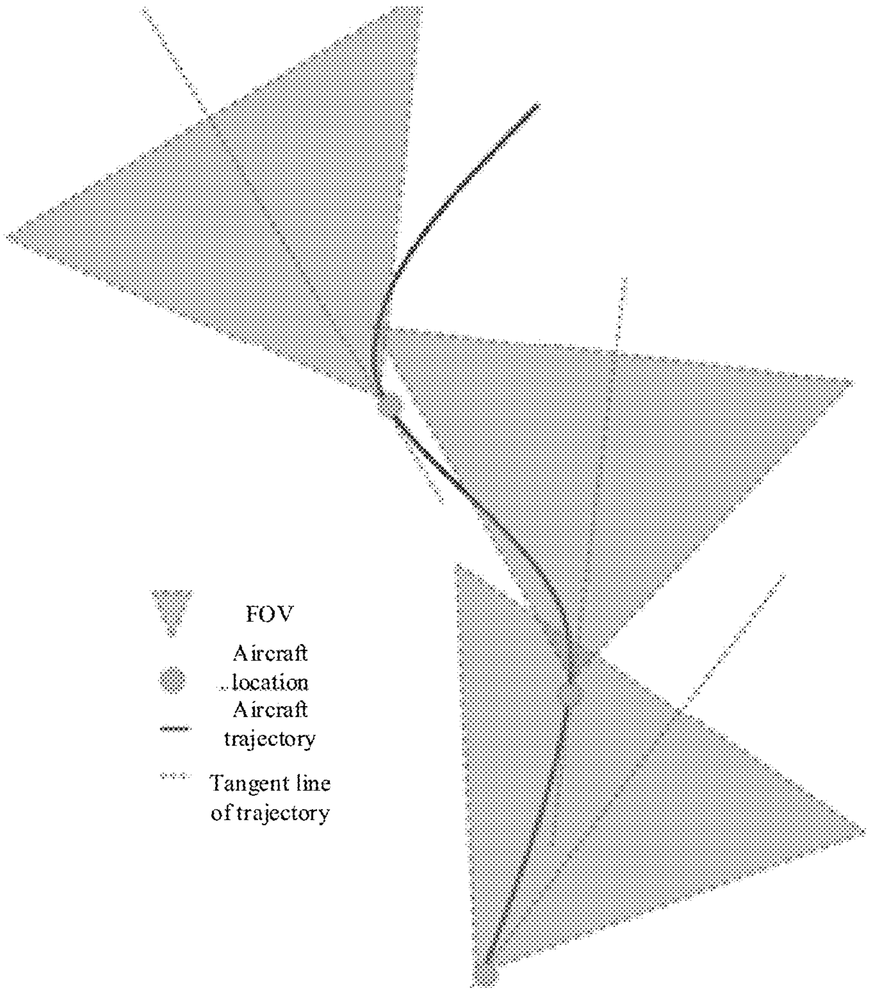
FIG. 3 is a schematic diagram showing performing heading control based on a tangent direction of a trajectory consistent with an embodiment of the present disclosure.

In a method of heading control based on the tangent direction of the trajectory, the heading of the sensing apparatus can be calculated according to the tangent direction of the trajectory. As shown in FIG. 3, a top view of the sensing apparatus is illustrated. To control the heading of the sensing apparatus, a tangent direction of the current location of the UAV at the trajectory can be calculated, and the tangent direction of the trajectory can be used as the heading. The sensing apparatus can be controlled based on the heading. In the above heading control method, the guide body or the joystick value is not required. The heading can be calculated by only providing the trajectory. However, with the heading determined in the above method, the length of the future trajectory that can be observed by the sensing apparatus can be short. Thus, the UAV can have a collision risk.

In summary, in the above technical solutions, the heading of the sensing apparatus cannot be automatically controlled in a task without a target point (tracking function) and a joystick guidance (APAS function). With the heading calculated using the tangent direction of other methods, the flight safety cannot be ensured for a non-omnidirectional UAV (assuming the front view of the UAV is observed). For an omnidirectional UAV, since a user cannot sense the direction in which the UAV is flying within a range corresponding to the sensing orientation, the user may end the task early. Especially, in a complex environment (such as dense forests) or a scene with a strong sense of oppression (flying around a building), the observation or photographing image of the UAV cannot be used at a maximal degree. Thus, the user may intervene in the task early or may not find that the calculated trajectory is not feasible in advance.

To address the above technical problem, embodiments of the present disclosure provide a method and apparatus for controlling the movable platform, the movable platform, and a storage medium. The movable platform can include an unmanned aerial vehicle (UAV), an unmanned vehicle, an unmanned ship, a movable robot, etc. The movable platform can include a sensing apparatus configured to sense the surrounding environment of the movable platform. The sensing apparatus can include at least one of a camera apparatus configured to collect an image, a distance sensor, a Lidar, or a depth sensor configured to realize a distance measurement operation. Those skilled in the art can select the corresponding sensing apparatus according to the application scenario or the application requirements.

Based on the movable platform above, the method for controlling the movable platform of embodiments of the present disclosure can include obtaining the trajectory of the movable platform, controlling the movable platform to move along the trajectory of the movable platform, determining a target sensing orientation of the sensing apparatus during the movement of the movable platform along the trajectory. If the sensing orientation of the sensing apparatus of the movable platform at the current location is the target sensing orientation, and N consecutive trajectory points that have not been reached after the current location on the trajectory can be within a characteristic sensing range of the sensing apparatus. An (N+1)-th trajectory point can be outside the characteristic sensing range. The target sensing orientation can be determined based on the locations of the (N+1) trajectory points. The method can further include adjusting the sensing orientation of the sensing apparatus to the target sensing orientation.

In the technical solution of embodiments of the present disclosure, the target sensing orientation of the sensing apparatus can be determined during the process of controlling the movable platform to move along the trajectory. The determined target sensing orientation can cause the N consecutive trajectory points that have not been reached starting from the current location on the trajectory to be located within the characteristic sensing range of the sensing apparatus, and the (N+1)-th trajectory point can be outside the characteristic sensing range. Thus, the heading of the sensing apparatus can be effectively determined only based on the trajectory of the movable platform without the joystick value and the target guide body, which facilitates the implementation of the automatic task of the sensing apparatus. In addition, when the sensing orientation of the sensing apparatus is adjusted to the target sensing orientation, since as many trajectory points as possible can be observed and detected in the determined target sensing orientation, the sensing apparatus can observe the longest route that the movable platform is about to reach when the movable platform moves along the route. Thus, the collision risk of the movable platform can be lowered, or the user can be assisted to observe the longest route that the movable platform is about to reach. Thus, the safety and reliability of the movement of the movable platform can be improved.

In connection with the accompanying drawings, embodiments of the method and apparatus for controlling the movable platform, the movable platform, and the storage medium are described in detail. When there is no conflict between embodiments of the present disclosure, embodiments and features of embodiments can be combined with each other.

Figure 4:
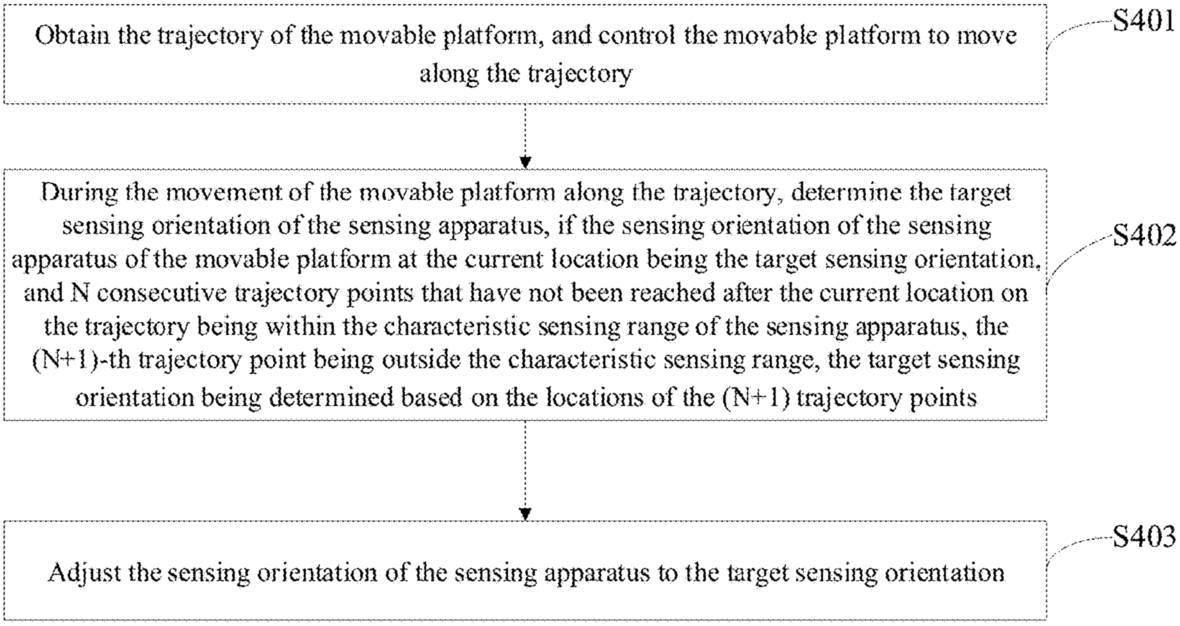
FIG. 4 is a schematic flowchart of a method for controlling a movable platform consistent with an embodiment of the present disclosure.

FIG. 4 is a schematic flowchart of a method for controlling a movable platform monitoring method consistent with an embodiment of the present disclosure. As shown in FIG. 4, embodiments of the present disclosure provide the method for controlling the movable platform. The movable platform can include a UAV, an unmanned vehicle, an unmanned ship, a movable robot, etc. The movable platform can include a sensing apparatus configured to detect the surrounding environment of the movable platform. The sensing apparatus can include at least one of a camera apparatus, a distance sensor, a Lidar, or a depth sensor. Those skilled in the art can select the corresponding sensing apparatus according to the application scenarios or application requirements.

For the movable platform of the above structure, embodiments of the present disclosure provide the method for controlling the movable platform. The execution body of the method can be a control apparatus of the movable platform. The control apparatus of the movable platform can be implemented by software or a combination of software and hardware. In some embodiments, the method includes the following processes.

At S401, the trajectory of the movable platform is obtained, and the movable platform is controlled to move along the trajectory.

At S402, during the movement of the movable platform along the trajectory, the target sensing orientation of the sensing apparatus is determined. If the sensing orientation of the sensing apparatus of the movable platform at the current location is the target sensing orientation, and N consecutive trajectory points that have not been reached after the current location on the trajectory are within the characteristic sensing range of the sensing apparatus. The (N+1)-th trajectory point is outside the characteristic sensing range. The target sensing orientation is determined based on the locations of the (N+1) trajectory points. In this disclosure, a trajectory point that the movable platform will reach in the future (i.e., that the movable platform have not reached) according to the current trajectory, i.e., a trajectory point after the current location, is also referred to as a "future trajectory point." The (N+1) consecutive trajectory points are future trajectory points.

At S403, the sensing orientation of the sensing apparatus is adjusted to the target sensing orientation.

The implementation principles of the above processes are described in detail below.

In process S401, the trajectory of the movable platform can refer to a trajectory route that is provided when the movable platform is about to move. The trajectory can be used to guide the movement operation of the movable platform. Different application scenarios can correspond to different trajectory acquisition methods. In some embodiments, the trajectory of the movable platform can be automatically generated. For example, the trajectory can be a return trajectory determined according to the return point of the movable platform. In some embodiments, the return point of the movable platform can include a corresponding location point when the movable platform is powered on or a location point designated by the user. The return trajectory can be determined according to the return point and the current location of the movable platform. For example, when the movable platform is the UAV, the return point can be a take-off point of the UAV or a location point designated by the user for the UAV. The return trajectory can be determined according to the return point and the current location point of the UAV.

In some embodiments, during the movement of the movable platform, when an operation status or an operation environment of the movable platform triggers the return operation, for example, if the power of the movable platform is insufficient, the return operation can be triggered. When the movable platform is abnormal, the return operation can be triggered. When the movable platform completes an operation task, the return operation can be triggered. In response to the triggered return operation, the return trajectory can be determined based on the current location of the movable platform and the return point of the movable platform. The return trajectory can be determined as the trajectory of the movable platform.

In some other scenarios, the trajectory of the movable platform can be the trajectory sent by a control terminal. Then, the movable platform and the control terminal can establish a wireless communication link. The control terminal can send the trajectory via the wireless communication link. In some embodiments, obtaining the trajectory of the movable platform can include obtaining the trajectory sent by the control terminal. The trajectory can be determined by the control terminal detecting the user trajectory editing. The control terminal can include a remote controller, a ground control platform, a cell phone, a tablet, a laptop, or a PC computer. The control terminal can include a control component configured for the user to input a trajectory editing operation (e.g., a joystick and an operation interface). When the trajectory editing operation input by the user is detected, the trajectory can be generated based on the detected user trajectory editing operation. Then, the control terminal can send the generated trajectory to the control apparatus of the movable platform to stably obtain the trajectory of the movable platform.

After the trajectory of the movable platform is obtained, the movable platform can be controlled to move along the trajectory. Thus, the movable platform can effectively move according to the obtained trajectory.

In process S402, the target sensing orientation of the sensing apparatus can be determined during the movement of the movable platform along the trajectory. If the sensing orientation of the sensing apparatus of the movable platform at the current location is the target sensing orientation, the N consecutive trajectory points that have not been reached starting from the current location can be located within the characteristic sensing range of the sensing apparatus. The (N+1)-th trajectory point can be located outside the characteristic sensing range. The target sensing orientation can be determined according to the N+1 trajectory points.

Figure 5:
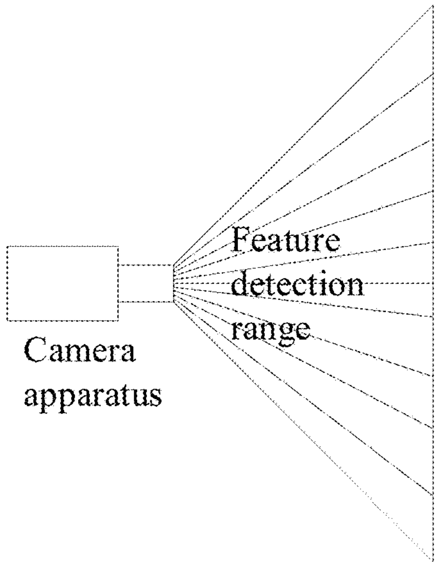
FIG. 5 is a schematic diagram showing a characteristic sensing range of a camera apparatus consistent with an embodiment of the present disclosure.
Figure 6:
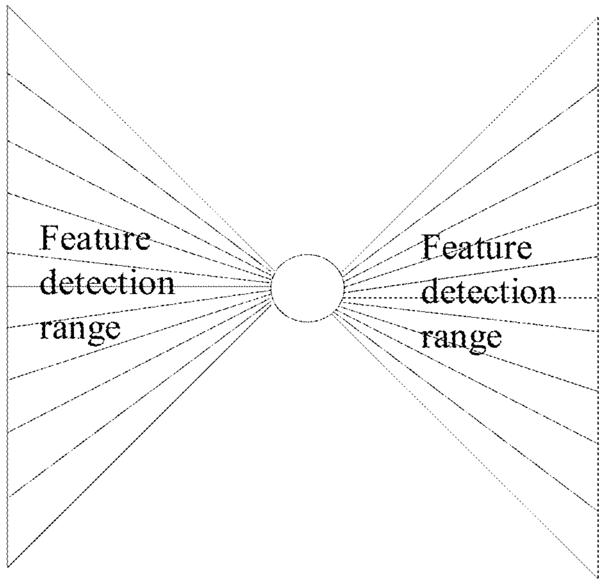
FIG. 6 is a schematic diagram showing a characteristic sensing range of a distance sensor consistent with an embodiment of the present disclosure.

For the sensing apparatus of the movable platform, the sensing apparatus can include a corresponding characteristic sensing range. The characteristic sensing range can refer to an area that can be sensed by the sensing apparatus. Different sensing apparatuses can correspond to different characteristic sensing ranges. For example, the characteristic sensing range can include a conical area, a pyramidal area, or another polygonal area. For example, as shown in FIG. 5, when the sensing apparatus is a camera apparatus, the characteristic sensing range can be the conical region corresponding to the camera, and the characteristic sensing range corresponding to the sensing apparatus can be the conical area corresponding to the camera apparatus. Thus, when an object is located in a conical area, the camera apparatus can photograph the above object. As shown in FIG. 6, when the sensing apparats is a distance sensor, the characteristic sensing range corresponding to the sensing apparatus can include two symmetrical conical areas corresponding to the distance sensor. When an object is in any of the conical areas, distance information between the above object and the movable platform can be obtained through the distance sensor. In some embodiments, to realize the accuracy and reliability for controlling the movable platform, the characteristic sensing range of the sensing apparatus of embodiments of the present disclosure can be smaller than or equal to the actual sensing range of the sensing apparatus.

During the movement of the movable platform along the trajectory, since the sensing apparatus can be arranged at the movable platform, the orientation of the movable platform can affect the orientation of the sensing apparatus. That is, when the orientation of the movable platform changes, the orientation of the sensing apparatus can also change. In some embodiments, the orientation of the movable platform can be consistent with the orientation of the sensing apparatus. In some other embodiments, the orientation of the movable platform can be inconsistent with the orientation of the sensing apparatus. For example, when the movable platform is the UAV, and the sensing apparatus is the camera. The camera can be carried by the UAV through a gimbal (e.g., a three-axis gimbal). The orientation of the camera can be adjusted by controlling the attitude of the gimbal, or the orientation of the camera can be controlled and adjusted through the attitude of the UAV and the attitude of the gimbal.

Figure 7:
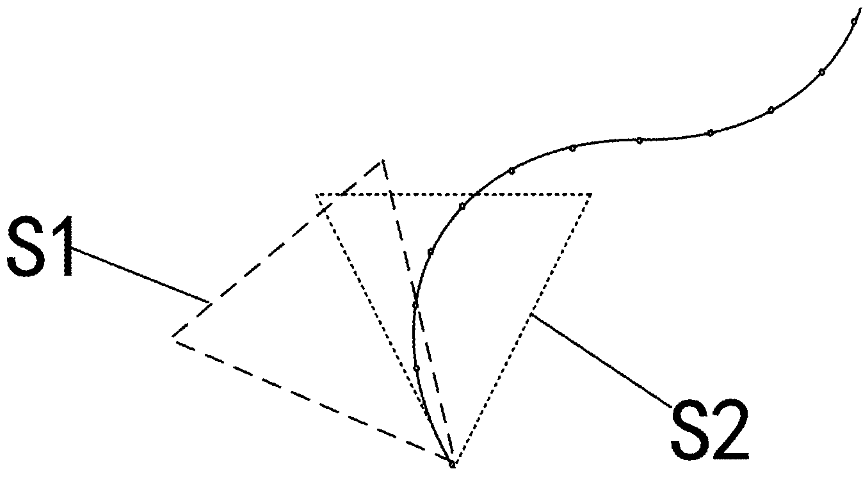
FIG. 7 is a schematic diagram showing a relationship between an orientation of the sensing apparatus and trajectory points consistent with an embodiment of the present disclosure.

For the sensing apparatus, when the orientation of the sensing apparatus is different, the trajectory points located in the characteristic sensing range corresponding to the sensing apparatus can change. As shown in FIG. 7, a plurality of key points are arranged at the trajectory. When the orientation of the sensing apparatus is S1, three key points are located in the characteristic sensing range corresponding to the sensing apparatus. When the orientation of the sensing apparatus is S2, five key points are located in the feature detection area corresponding to the sensing apparatus.

After the trajectory of the movable platform is obtained, the trajectory points corresponding to the trajectory can be obtained. The trajectory points can be position points obtained by sampling the trajectory. In some embodiments, sampling the trajectory of the movable platform to obtain the trajectory points can include sampling the trajectory of the movable platform based on time information to obtain the trajectory points. In some embodiments, one trajectory point can be determined every 5 s (e.g., 3 s, 8 s, or 10 s) at the trajectory of the movable platform. Thus, the plurality of trajectory points corresponding to the trajectory of the movable platform can be obtained. In some other embodiments, sampling the trajectory of the movable platform to obtain the trajectory points can include sampling the trajectory of the movable platform based on the distance information to obtain the trajectory points. In some embodiments, one trajectory point can be determined every 1 m(e.g., 5 m, 8 m, or 10 m) at the trajectory of the movable platform. Thus, the plurality of trajectory points corresponding to the trajectory of the movable platform can be obtained.

Based on the above, when the sensing apparatus has different orientations, different numbers of key points of the trajectory can be located in the characteristic sensing ranges corresponding to the sensing apparatus. To cause the sensing apparatus to detect key points as many as possible to ensure the safety and reliability of the operation of the movable platform, during the movement of the movable platform along the trajectory, the target sensing orientation of the sensing apparatus can be determined. If the sensing orientation of the sensing apparatus of the movable platform at the current location is the target sensing orientation, the N consecutive trajectory points on the trajectory that have not been reached, starting from the current location, can be located within the characteristic sensing range of the sensing apparatus. The (N+1)-th trajectory point can be outside the characteristic sensing range. The target sensing orientation can be determined according to the locations of the N+1 trajectory points. Thus, the obtained target sensing orientation can include the N consecutive trajectory points that have not been reached as many as possible.

In some embodiments, determining the target sensing orientation of the sensing apparatus can include obtaining a pre-trained machine learning model, and inputting the obtained trajectory of the movable platform into the machine learning model to quickly and accurately obtain the target sensing orientation of the sensing apparatus.

In process S403, after the target sensing orientation is obtained, the sensing orientation of the sensing apparatus can be adjusted to the target sensing orientation. Since as many as possible trajectory points can be observed or detected with the determined target sensing orientation, by adjusting the sensing orientation of the sensing apparatus to the target sensing orientation, the characteristic sensing range of the sensing apparatus can include as many as possible trajectory points. Thus, the collision risk can be reduced for the movable platform, and the safety and reliability of the movement of the movable platform can be further improved.

In the method for controlling the movable platform of embodiments of the present disclosure, the trajectory of the movable platform can be obtained, the movable platform can be controlled to move along the trajectory. During the movement of the movable platform along the trajectory, the target sensing orientation of the sensing apparatus can be determined. With the determined target sensing orientation, the N consecutive trajectory points of the trajectory that have not been reached starting from the current location can be located within the characteristic sensing range of the sensing apparatus. The (N+1)-th trajectory point can be outside the characteristic sensing range. Thus, the orientation of the sensing apparatus can be determined only based on the trajectory of the movable platform without the joystick value and the target body, which facilitates the automatic task of the sensing apparatus. In addition, when the sensing orientation of the sensing apparatus is adjusted to the target sensing orientation, with the determined target sensing orientation, as many as possible trajectory points can be observed or detected. Thus, when the movable platform moves along the route, the sensing apparatus can observe the longest route that the movable platform is about to reach. Then, the collision risk of the movable platform can be reduced, or the user can be assisted to observe the longest route that the movable platform is about to reach. Thus, the safety and reliability of the movement of the movable platform can be improved.

In some embodiments, when the sensing apparatus is the camera apparatus, the method of embodiments of the present disclosure can further include sending the image collected by the camera apparatus to the control terminal via the wireless communication link to cause the control terminal to display the image.

In some embodiments, the wireless communication link can be established between the camera apparatus and the control terminal. A network standard of the wireless communication link can include any one of 2G (GSM), 2.5G (GPRS), 3G (WCDMA, TD-SCDMA, CDMA2000, UMTS), 4G (LTE), 4G+(LTE+), WiMax, 5G, etc. When the sensing apparatus is the camera apparatus, the camera apparatus can be configured to collect the image and send the collected image to the control terminal via the wireless communication link. Thus, the control terminal can obtain the image collected by the camera apparatus. After obtaining the image, the control terminal can display the image to allow the user to quickly and directly view the image collected by the camera apparatus.

Figure 8:
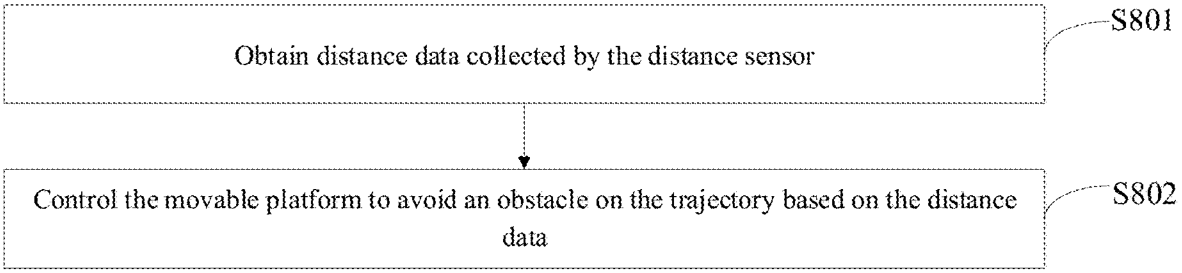
FIG. 8 is a schematic flowchart of another method for controlling a movable platform consistent with an embodiment of the present disclosure.

FIG. 8 is a schematic flowchart of another method for controlling a movable platform consistent with an embodiment of the present disclosure. A shown in FIG. 8, when the sensing apparatus includes the distance sensor, the method of embodiments of the present disclosure further includes the following processes.

At S801, distance data collected by the distance sensor is obtained.

At S802, the movable platform is controlled to avoid an obstacle on the trajectory based on the distance data.

When the sensing apparatus includes the distance sensor, during the movement of the movable platform along the trajectory, distance data collected by the distance sensor can be obtained. Then, the distance data can be analyzed and processed. Thus, the movable platform can be controlled to avoid the obstacle on the trajectory based on the analysis result. In some embodiments, controlling the movable platform to avoid the obstacle on the trajectory based on the distance data can include, when the distance data is less than or equal to a predetermined threshold, indicating that the obstacle exists in the operation environment of the movable platform. The distance to the obstacle can be small. Thus, to ensure the safety and reliability of the operation of the movable platform, a movement location of the movable platform can be adjusted based on the distance information to avoid the obstacle on the trajectory. When the distance data is greater than the predetermined threshold, the obstacle can exist in the operation environment of the movable platform. The distance to the obstacle can be large. Thus, the operation status of the movable platform can be controlled to keep unchanged.

In embodiments of the present disclosure, when the obstacle exists in the trajectory of the movable platform, the movable platform can be controlled to perform the obstacle avoidance operation according to the distance data collected by the distance sensor. Thus, the collision risk of the movable platform can be reduced, and the safety and reliability of the operation of the movable platform can be improved.

Figure 9:
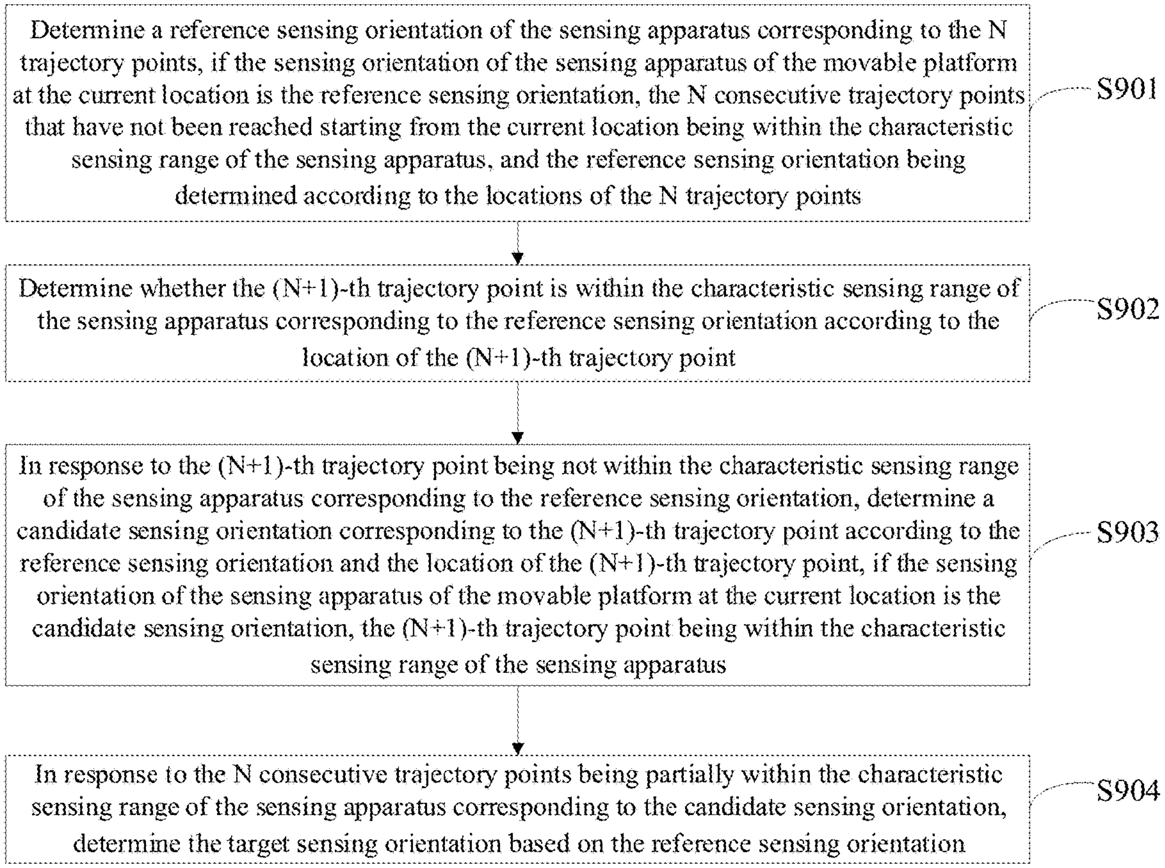
FIG. 9 is a schematic flowchart showing determining a target sensing orientation of a sensing apparatus consistent with an embodiment of the present disclosure.

FIG. 9 is a schematic flowchart showing determining a target sensing and measurement orientation of a sensing and measurement apparatus consistent with an embodiment of the present disclosure. As shown in FIG. 9, embodiments of the present disclosure provide an implementation method for determining the target sensing orientation of the sensing apparatus. In some embodiments, determining the target sensing orientation of the sensing apparatus includes the following processes.

At S901, a reference sensing orientation of the sensing apparatus corresponding to the N trajectory points is determined. If the sensing orientation of the sensing apparatus of the movable platform at the current location is the reference sensing orientation, the N consecutive trajectory points that have not been reached starting from the current location can be within the characteristic sensing range of the sensing apparatus. The reference sensing orientation can be determined according to the locations of the N trajectory points.

After the trajectory of the movable platform is obtained, data sampling can be performed on the trajectory of the movable platform to obtain a plurality of trajectory points corresponding to the trajectory. For example, N trajectory points can be used as the plurality of trajectory points. After the N trajectory points are obtained, the locations of the N trajectory points can be analyzed to obtain the reference sensing orientation of the sensing apparatus corresponding to the N trajectory points. If the sensing orientation of the sensing apparatus of the movable platform at the current location is the reference sensing orientation, the N consecutive trajectory points starting from the current location can be located within the characteristic sensing range of the sensing apparatus.

Figure 10:
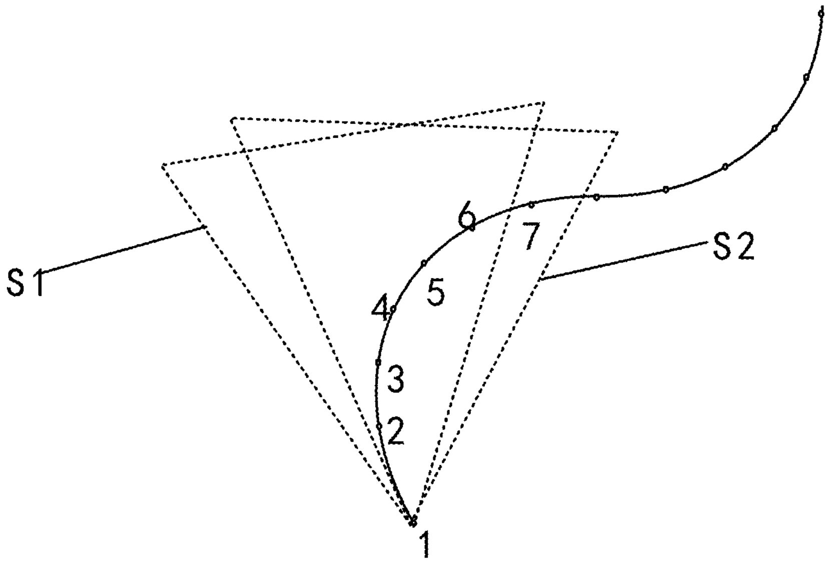
FIG. 10 is a schematic diagram showing determining a reference sensing orientation of a sensing apparatus corresponding to N trajectory points consistent with an embodiment of the present disclosure.

For example, N can be 6, and the current location can be location 1. As shown in FIG. 10, after determining 7 trajectory points based on the trajectory of the movable platform, the reference sensing orientation of the sensing apparatus corresponding to the 7 trajectory points can be determined. The reference sensing orientation can be S. Then, when the sensing orientation of the movable platform at location 1 is S, the 6 consecutive trajectory points (location 2, location 3, location 4, location 5, location 6, and location 7) that have not been reached starting from location 1 are within the characteristic sensing range of the sensing apparatus.

At S902, whether the (N+1)-th trajectory point is within the characteristic sensing range of the sensing apparatus corresponding to the reference sensing orientation is determined according to the location of the (N+1)-th trajectory point.

After the reference sensing orientation is obtained, the characteristic sensing range of the sensing apparatus corresponding to the reference sensing orientation can be determined. Since the (N+1)-th trajectory point is outside the characteristic sensing range when the sensing orientation of the sensing apparatus is the target sensing orientation, the location of the (N+1)-th trajectory point can be determined through the trajectory of the movable platform to ensure the accuracy and reliability of determining the target sensing orientation. Then, the locations of the (N+1) trajectory points and the characteristic sensing range of the sensing apparatus corresponding to the reference sensing orientation can be analyzed and processed to determine whether the (N+1)-th trajectory point is within the characteristic sensing range of the sensing apparatus corresponding to the reference sensing orientation.

At S903, in response to the (N+1)-th trajectory point being not within the characteristic sensing range of the sensing apparatus corresponding to the reference sensing orientation, a candidate sensing orientation corresponding to the (N+1)-th trajectory point is determined according to the reference sensing orientation and the location of the (N+1)-th trajectory point. If the sensing orientation of the sensing apparatus of the movable platform at the current location is the candidate sensing orientation, the (N+1)-th trajectory point is within the characteristic sensing range of the sensing apparatus.

In some embodiments, the result of analyzing the locations of the N+1 trajectory points and the characteristic sensing range of the sensing apparatus corresponding to the reference sensing orientation can include that when the N+1 trajectory points are not within the characteristic sensing range of the sensing apparatus corresponding to the reference sensing orientation, the reference sensing orientation and the location of the (N+1)-th trajectory point can be analyzed to determine the candidate sensing orientation corresponding to the (N+1)-th trajectory point.

Figure 11:
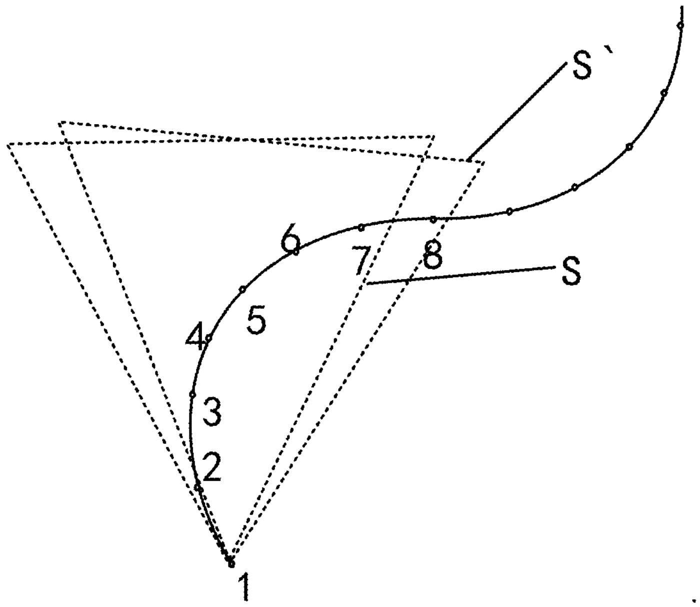
FIG. 11 is a schematic diagram showing a candidate sensing orientation corresponding to an (N+1)-th trajectory point consistent with an embodiment of the present disclosure.

For example, N can be 6, and the current location can be location 1. As shown in FIG. 11, after determining 7 trajectory points based on the trajectory of the movable platform, the reference sensing orientation of the sensing apparatus corresponding to the 7 trajectory points can be determined. Then, the reference sensing orientation is S. When the orientation of the sensing apparatus of the movable platform at location 1 is S, the 6 consecutive trajectory points (location 2, location 3, location 4, location 5, location 6, and location 7) starting from location 1 can be within the characteristic sensing range of the sensing apparatus.

Then, the 8-th trajectory point of the movable platform can be obtained, and the location information of the 8-th trajectory point can be determined. Based on the location information of the 8-th trajectory point and characteristic sensing range of the sensing apparatus corresponding to the reference sensing orientation, the 8-th trajectory point can be determined to be not located in the characteristic sensing range of the sensing apparatus corresponding to the reference sensing orientation. Then, the candidate sensing orientation corresponding to the 8-th trajectory point can be determined based on the reference sensing orientation and the location of the 8-th trajectory point. The candidate sensing orientation can be S'. If the sensing orientation of the sensing apparatus of the movable platform at position 1 is the candidate sensing orientation S', the 8-th trajectory point can be within the characteristic sensing range of the sensing apparatus.

At S904, in response to the N consecutive trajectory points being partially within the characteristic sensing range of the sensing apparatus corresponding to the candidate sensing orientation, the target sensing orientation is determined based on the reference sensing orientation.

After the candidate sensing orientation is obtained, the location information of the N consecutive trajectory points can be obtained based on the trajectory of the movable platform. Then, the location information of the N consecutive trajectory points and the characteristic sensing range of the sensing apparatus corresponding to the candidate sensing orientation can be analyzed to identify whether the N consecutive trajectory points are within the characteristic sensing range of the sensing apparatus corresponding to the candidate sensing orientation. If the N consecutive trajectory points are partially within the characteristic sensing range of the sensing apparatus corresponding to the candidate sensing orientation, i.e., not all the N consecutive trajectory points are within the characteristic sensing range of the sensing apparatus corresponding to the candidate sensing orientation, the obtained candidate sensing orientation cannot cause the sensing apparatus to detect the trajectory points as many as possible. Thus, the reference sensing orientation can be analyzed to determine the target sensing orientation.

For example, as shown in FIG. 11, when the candidate sensing orientation is S', the second trajectory point of the movable platform is not within the characteristic sensing range of the sensing apparatus corresponding to the candidate sensing orientation S', i.e., the 8 consecutive trajectory points are partially within the characteristic sensing range of the sensing apparatus corresponding to the candidate sensing orientation S', the obtained candidate sensing orientation S' cannot cause the sensing apparatus to detect the trajectory points as many as possible. Thus, the reference sensing orientation can be analyzed to determine the target sensing orientation.

In some embodiments, determining the target sensing orientation according to the reference sensing orientation can include determining the reference sensing orientation as the target sensing orientation. For example, as shown in FIG. 11, when the reference sensing orientation is S, because the sensing orientation of the sensing apparatus of the movable platform at position 1 is S, the 6 consecutive trajectory points (position 2, position 3, position 4, position 5, position 6, and position 7) that have not been reached starting from position 1 on the trajectory are within the characteristic sensing range of the sensing apparatus. That is, the reference sensing orientation S can cause the characteristic sensing range of the sensing apparatus to include as many trajectory points as possible. Therefore, the reference sensing orientation S can be determined as the target sensing orientation to effectively ensure the accuracy and reliability of determining the target sensing orientation.

In some other embodiments, determining the target sensing orientation according to the reference sensing orientation can include determining the target sensing orientation according to the reference sensing orientation and the candidate sensing orientation.

For example, as shown in FIG. 11, when the reference sensing orientation is S. When the sensing orientation of the sensing apparatus of the movable platform at position 1 is S, the 6 consecutive trajectory points (position 2, position 3, position 4, position 5, position 6, and position 7) that have not been reached starting from position 1 on the trajectory are within the characteristic sensing range of the sensing apparatus. However, when the candidate sensing orientation is S', the second trajectory point of the movable platform is not within the characteristic sensing range of the sensing apparatus corresponding to the candidate sensing orientation S'. That is, the 8 consecutive trajectory points are partially within the characteristic sensing range of the sensing apparatus corresponding to the candidate sensing orientation S'. Thus, the obtained candidate sensing orientation S' cannot cause the sensing apparatus to detect as many trajectory points as possible. Then, the reference sensing orientation S and the candidate sensing orientation S' can be analyzed to determine the target sensing orientation. Then, the target sensing orientation can be between the reference sensing orientation S and the candidate sensing orientation S'.

Figure 12:
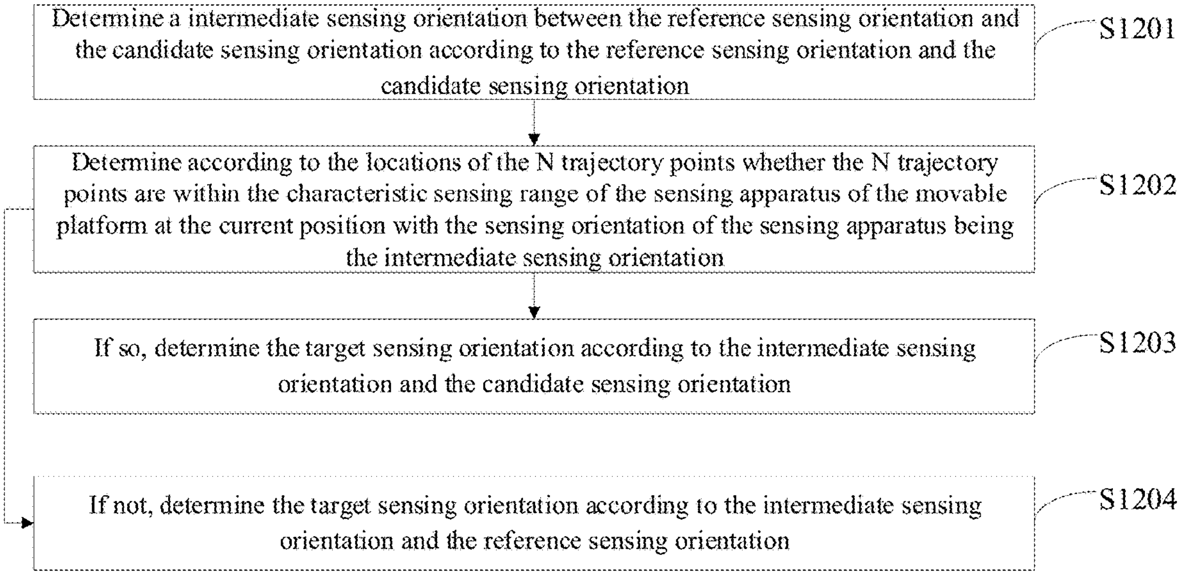
FIG. 12 is a schematic flowchart showing determining a target sensing orientation according to a reference sensing orientation and a candidate sensing orientation consistent with an embodiment of the present disclosure.

In some other embodiments, as shown in FIG. 12, embodiments of the present disclosure provide a method for determining the target sensing orientation according to the reference sensing orientation and the candidate sensing orientation. In some embodiments, determining the target sensing orientation according to reference sensing orientation and the candidate sensing orientation can include the following processes.

At S1201, an intermediate sensing orientation between the reference sensing orientation and the candidate sensing orientation is determined according to the reference sensing orientation and the candidate sensing orientation.

Figure 13:
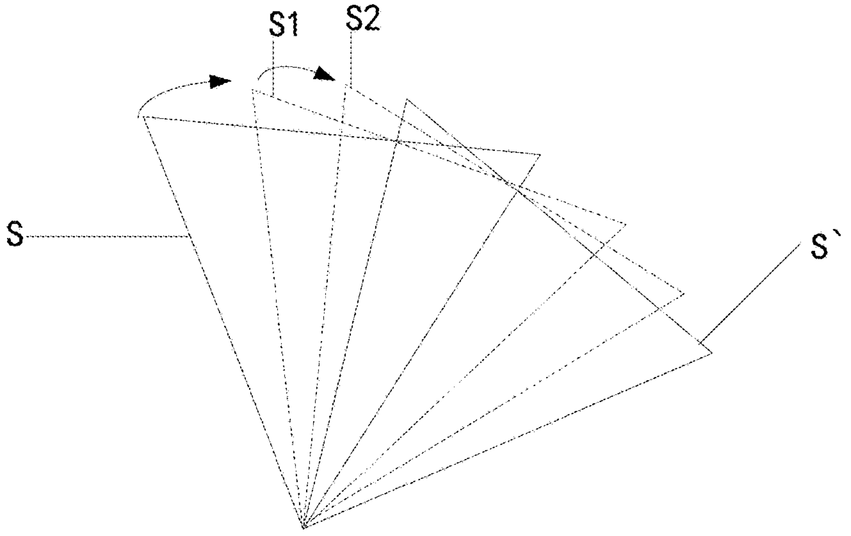
FIG. 13 is a schematic diagram showing an intermediate sensing orientation between a reference sensing orientation and a candidate sensing orientation consistent with an embodiment of the present disclosure.

After the reference sensing orientation and the candidate sensing orientation are obtained, the reference sensing orientation and the candidate sensing orientation can be analyzed to determine the intermediate sensing orientation between the reference sensing orientation and the candidate sensing orientation, i.e., the intermediate sensing orientation is a sensing orientation that the sensing apparatus may have while rotating from the reference sensing orientation to the candidate sensing orientation. As shown in FIG. 13, when the reference sensing orientation is S, and the candidate sensing orientation is S', by performing the analysis on the reference sensing orientation S and the candidate sensing orientation S', the intermediate sensing orientations S1 and S2 between the reference sensing orientation and the candidate sensing orientation are determined. One or more intermediate sensing orientations can be provided.

At S1202, it is determined according to the locations of the N trajectory points whether the N trajectory points are within the characteristic sensing range of the sensing apparatus of the movable platform at the current location with the sensing orientation of the sensing apparatus being the intermediate sensing orientation.

After the intermediate sensing orientation between the reference sensing orientation and the candidate sensing orientation is determined, the intermediate sensing orientation can be analyzed to obtain the characteristic sensing range of the sensing apparatus of the movable platform at the current location with the sensing orientation of the sensing apparatus being the intermediate sensing orientation. After the characteristic sensing range is obtained, the locations of the N trajectory points and the characteristic sensing range can be analyzed to determine whether the N trajectory points are within the characteristic sensing range corresponding to the sensing orientation as the intermediate sensing orientation.

At S1203, if so, the target sensing orientation is determined according to the intermediate sensing orientation and the candidate sensing orientation.

At S1204, if not, the target sensing orientation is determined according to the intermediate sensing orientation and the reference sensing orientation.

When the N trajectory points are within the characteristic sensing range of the sensing apparatus of the movable platform at the current location with the sensing orientation of the sensing apparatus being the intermediate sensing orientation, the characteristic sensing range corresponding to the intermediate sensing orientation can include as many N consecutive trajectory points that have not been reached as possible. To determine the target sensing orientation that can include more trajectory points, the intermediate sensing orientation and the candidate sensing orientation can be analyzed to determine the target sensing orientation.

When the N trajectory points are not within the characteristic sensing range of the sensing apparatus of the movable platform at the current location with the sensing orientation of the sensing apparatus being the intermediate sensing orientation, the N trajectory points can be partially within the characteristic sensing range of the sensing orientation that is the intermediate sensing orientation of the sensing apparatus of the movable platform at the current location. Thus, the characteristic sensing range corresponding to the intermediate sensing orientation may not include as many N consecutive trajectory points that have not been reached as possible. To determine the target sensing orientation that includes more trajectory points, the intermediate sensing orientation and the reference sensing orientation can be analyzed to determine the target sensing orientation.

In some embodiments, the intermediate sensing orientation between the reference sensing orientation and the candidate sensing orientation can be determined according to the reference sensing orientation and the candidate sensing orientation. Whether the N trajectory points are within the characteristic sensing range of the sensing orientation that is the intermediate sensing orientation of the sensing apparatus of the movable platform at the current location can be determined according to the locations of the N trajectory points. When the N trajectory points are within the characteristic sensing range of the sensing orientation that is the intermediate sensing orientation of the sensing apparatus of the movable platform at the current location, the target sensing orientation can be determined according to the intermediate sensing orientation and the candidate sensing orientation. When the N trajectory points are not within the characteristic sensing range of the sensing orientation that is the intermediate sensing orientation of the sensing apparatus of the movable platform at the current location, the target sensing orientation can be determined according to the intermediate sensing orientation and the reference sensing orientation. Thus, the accuracy and reliability of determining the target sensing orientation can be ensured.

Figure 14:
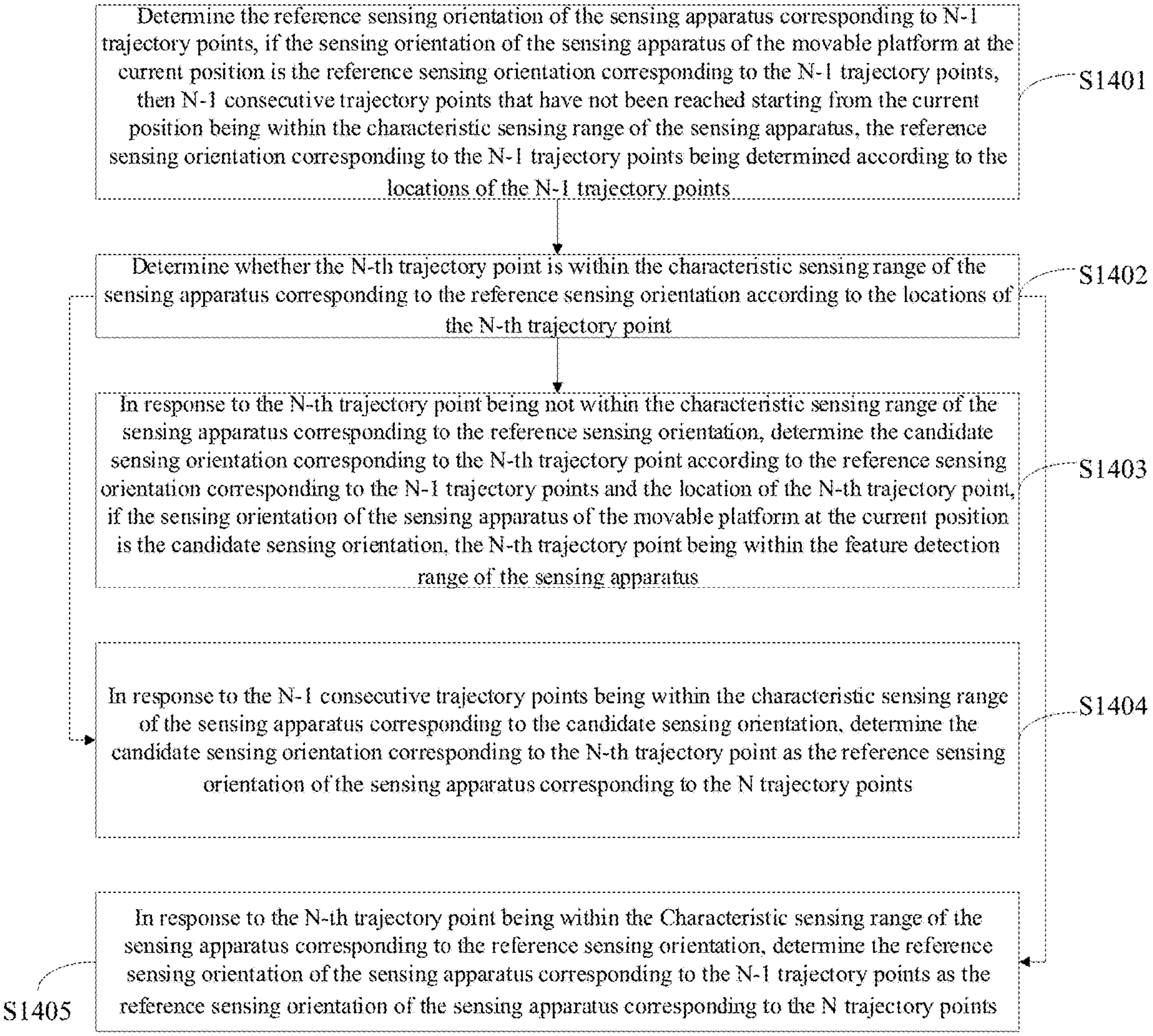
FIG. 14 is a schematic diagram showing determining a reference sensing orientation of a sensing apparatus corresponding to N trajectory points consistent with an embodiment of the present disclosure.

FIG. 14 is a schematic diagram showing determining a reference sensing and measurement orientation of a sensor apparatus corresponding to N trajectory points consistent with an embodiment of the present disclosure. As shown in FIG. 14, embodiments of the present disclosure provide a method for determining the reference sensing orientation of the sensing apparatus corresponding to the N trajectory points. In some embodiments, determining the reference sensing orientation of the sensing apparatus corresponding to the N trajectory points includes the following processes.

At S1401, the reference sensing orientation of the sensing apparatus corresponding to N−1 trajectory points is determined. If the sensing orientation of the sensing apparatus of the movable platform at the current location is the reference sensing orientation corresponding to the N−1 trajectory points, then N−1 consecutive trajectory points that have not been reached starting from the current location are within the characteristic sensing range of the sensing apparatus. The reference sensing orientation corresponding to the N−1 trajectory points is determined according to the locations of the N−1 trajectory points.

At S1402, whether the N-th trajectory point is within the characteristic sensing range of the sensing apparatus corresponding to the reference sensing orientation is determined according to the locations of the N-th trajectory point.

At S1403, in response to the N-th trajectory point being not within the characteristic sensing range of the sensing apparatus corresponding to the reference sensing orientation, the candidate sensing orientation corresponding to the N-th trajectory point is determined according to the reference sensing orientation corresponding to the N−1 trajectory points and the location of the N-th trajectory point. If the sensing orientation of the sensing apparatus of the movable platform at the current location is the candidate sensing orientation, the N-th trajectory point is within the characteristic sensing range of the sensing apparatus.

The implementation method, principle, and effect of the processes above can be similar to the implementation method, principle, and effect of processes S901 to S903 above. For specific description, reference can be made to the above content, which is not repeated here.

At S1404, in response to the N−1 consecutive trajectory points being within the characteristic sensing range of the sensing apparatus corresponding to the candidate sensing orientation, the candidate sensing orientation corresponding to the N-th trajectory point is determined as the reference sensing orientation of the sensing apparatus corresponding to the N trajectory points.

After the candidate sensing orientation is obtained, the location information of the N−1 consecutive trajectory points can be obtained based on the trajectory of the movable platform. Then, the location information of the N−1 consecutive trajectory points and the characteristic sensing range of the sensing apparatus corresponding to the candidate sensing orientation can be analyzed to identify whether the N−1 consecutive trajectory points are within the characteristic sensing range of the sensing apparatus corresponding to the candidate sensing orientation. When the N consecutive trajectory points are within the characteristic sensing range of the sensing apparatus corresponding to the candidate sensing orientation, i.e., the N consecutive trajectory points are within the characteristic sensing range of the sensing apparatus corresponding to the candidate sensing orientation, the obtained candidate sensing orientation can cause the sensing apparatus to detect as many trajectory points as possible. Thus, the candidate sensing orientation corresponding to the N-th trajectory point can be determined as the reference sensing orientation of the sensing apparatus corresponding to the N trajectory points. Thus, the accuracy and reliability of determining the candidate sensing orientation can be effectively ensured.

At S1405, in response to the N-th trajectory point being within the characteristic sensing range of the sensing apparatus corresponding to the reference sensing orientation, the reference sensing orientation of the sensing apparatus corresponding to the N−1 trajectory points is determined as the reference sensing orientation of the sensing apparatus corresponding to the N trajectory points.

After the reference sensing orientation corresponding to the N−1 trajectory points is obtained, the N-th trajectory point can be determined to be in the characteristic sensing range of the sensing apparatus corresponding to the reference sensing orientation. The location information of the N consecutive trajectory points can be obtained based on the trajectory of the movable platform. Then, the location information of the N consecutive trajectory points and the characteristic sensing range of the sensing apparatus corresponding to the reference sensing orientation can be analyzed to identify whether the N consecutive trajectory points are within the characteristic sensing range of the sensing apparatus corresponding to the reference sensing orientation. When the N consecutive trajectory points are within the characteristic sensing range of the sensing apparatus corresponding to the reference sensing orientation, the obtained reference sensing orientation corresponding to the N−1 trajectory points can cause the sensing apparatus to detect as many trajectory points as possible. Thus, the reference sensing orientation of the sensing apparatus corresponding to the N−1 trajectory points can be determined as the reference sensing orientation of the sensing apparatus corresponding to the N trajectory points. Then, the accuracy and reliability of determining the reference sensing orientation can be effectively ensured.

In some embodiments, by determining the reference sensing orientation of the sensing apparatus corresponding to the N−1 trajectory points, whether the N-th trajectory point is within the characteristic sensing range of the sensing apparatus corresponding to the reference sensing orientation can be determined. The reference sensing orientation of the sensing apparatus corresponding to the N trajectory points can be determined according to an analysis result of whether the N trajectory points are within the characteristic sensing range of the sensing apparatus corresponding to the reference sensing orientation. Thus, the accuracy and reliability of determining the reference sensing orientation can be effectively ensured, and the reliability of controlling the movable platform according to the reference sensing orientation can be improved.

In some embodiments, for example, the UAV can be used as the movable platform, and the camera apparatus can be used as the sensing apparatus. Embodiments of the present disclosure provide a method for controlling the camera apparatus of the UAV. In the method, after the UAV obtains landmarks (trajectory points) of a target flight, the UAV can autonomously fly according to a heading in which most landmarks can be observed or sensed. Thus, the safety and reliability of the operation of the UAV can be ensured. The method can be applied to a scenario with a specific requirement (most landmarks observed or sensed) for the heading, e.g., industrial auxiliary inspection, aerial target reconnaissance, intelligent return, etc.

In some embodiments, to facilitate understanding of the control principle of application embodiments, the FOV range corresponding to the camera apparatus can be first described. The FOV range of the camera apparatus can be modeled as a cone. Each FOV range can be represented by a vector $\vec{f}$ and an angle $\varphi$ in three-dimensional space. Here, $\vec{f}$ is a three-dimensional vector pointing from the vertex of the FOV range to the center of the bottom of the cone.

Figure 15:
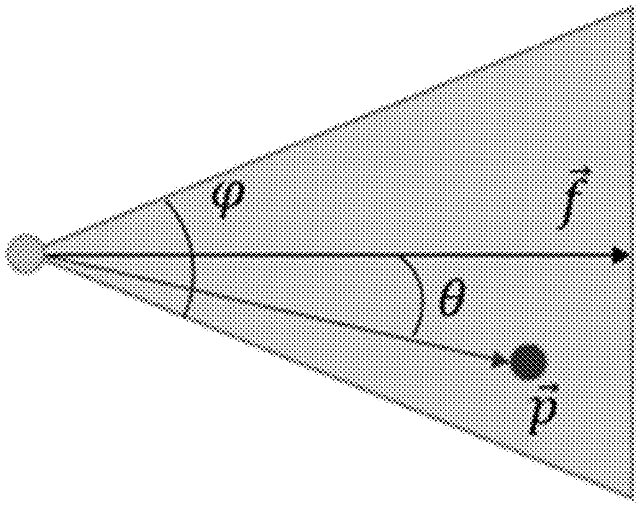
FIG. 15 is a schematic diagram showing a field of view corresponding to a sensing apparatus consistent with an embodiment of the present disclosure.

For any point in space, whether the point is within the FOV range can be determined by determining the vector angle. As shown in FIG. 15, for a trajectory point P in space, the vector $\vec{p}$ from the cone vertex to the point is calculated. Then, the cosine of the angle $\theta$ between vectors $\vec{f}$ and $\hat{p}$ is calculated as $$\cos\theta = \frac{\vec{f} \cdot \vec{p}}{|\vec{f}||\vec{p}|}.$$

The angle θ can be determined according to cos θ. After the angle θ is obtained, angle θ can be compared with $$\frac{\varphi}{2}.$$

When $$\theta \leqslant \frac{\varphi}{2},$$

the point in space can be determined to be within the cone, i.e., the FOV range. Thus, the recognition operation can be accurately performed on whether the point is in the FOV range.

Based on the above implementation principle, the control method of the UAV can include the following processes.

Process 1, the trajectory of the UAV and the first orientation (as an initial orientation by default) corresponding to the camera apparatus are obtained. The first orientation corresponds to the first FOV range.

Process 2, the UAV is controlled to move along the trajectory.

Process 3, the N consecutive trajectory points that have not been reached starting from the current location are determined from the trajectory.

Process 4, whether the N consecutive trajectory points that are not executed of the trajectory are within the first FOV range corresponding to the camera apparatus.

Process 5, if the N consecutive trajectory points that are not executed of the trajectory are within the first FOV range, N+1 trajectory points are obtained, and whether the N+1 trajectory points are within the first FOV range is detected.

For the N consecutive trajectory points of the trajectory that are not executed, whether the trajectory points are within the first FOV range can be sequentially determined. If the N consecutive trajectory points are within the first FOV range, the trajectory points can be observed or sensed without turning the first FOV range corresponding to the camera apparatus. Thus, for the camera apparatus, the (N+1)-th trajectory point can be directly obtained without any operation.

Process 6, if the N consecutive trajectory points that are not executed are starting from the current location of the trajectory within the first FOV range and the (N+1)-th trajectory point is outside the first FOV range, the target sensing orientation of the camera apparatus is determined based on the locations of the (N+1) trajectory points.

Process 7, if the N consecutive trajectory points that are not executed starting from the current location of the trajectory are not within the first FOV range and the (N+1)-th trajectory point.

When the N consecutive trajectory points are not within the first FOV range, the Nth trajectory point may not be within the first FOV range, and the current heading of the camera apparatus may need to be adjusted. Thus, the FOV range of the rotated camera apparatus can include the N-th trajectory point. Adjusting the first orientation of the camera apparatus can include determining the second orientation corresponding to the N-th trajectory point based on the location of the N-th trajectory point and the first orientation. The adjusted FOV range of the second orientation can include N trajectory points. In some embodiments, to make the N trajectory points to be within the FOV range corresponding to the camera apparatus, the current orientation of the camera apparatus of the UAV can be adjusted. The adjustment range can be $$\left(\theta - \frac{\varphi}{2}, \theta + \frac{\varphi}{2}\right).$$

Θ is the angle between the N-th trajectory point and the center line of the FOV range.

$$\frac{\varphi}{2}$$

can be the angle between the edge of the FOV range and the center line of the FOV range. After the heading of the camera apparatus of the UAV is adjusted, the second orientation corresponding to the N trajectory points can be obtained.

Process 8, whether the N−1 consecutive trajectory points that are not executed of the trajectory are within the second FOV range corresponding to the second orientation.

Process 9, when the N−1 consecutive trajectory points that are not executed of the trajectory are within the second FOV range corresponding to the second orientation, the second orientation is determined as the target sensing orientation of the camera apparatus. When the N−1 consecutive trajectory points that are not executed of the trajectory are not within the second FOV range corresponding to the second orientation, i.e., when a part of the previous N−1 trajectory points is within the adjusted FOV range, the target sensing orientation of the camera apparatus is determined based on the first orientation corresponding to the N−1 consecutive trajectory points that have not been reached and the second orientation corresponding to the N-th trajectory point.

Determining the target sensing orientation of the camera apparatus based on the first orientation and the second orientation can include obtaining the center orientation between the first orientation and the second orientation according to the predetermined parameter, determining whether the N trajectory points are within the center FOV range according to the N trajectory points, if yes, determining the target sensing orientation according to the center FOV range and the adjusted FOV range, and if not, determining the target sensing orientation according to the center FOV range and the current FOV range.

The implementations of "determining the target sensing orientation according to the center FOV range and the adjusted FOV range" and "determining the target sensing orientation according to the center FOV range and the current FOV range" can be similar to the implementation of "determining the target sensing orientation of the camera apparatus based on the first orientation and the second orientation." Thus, a continuously recycled iteration can be realized to find the target sensing orientation that includes as many trajectory points as possible.

An orientation adjustment precision $\varepsilon_{min}$ (e.g., 0.01°, 0.05°, or 0.1°) Can be pre-set. When the orientation adjustment precision for the camera apparatus is less than or equal to the above orientation adjustment precision, i.e., $\varepsilon \leq \varepsilon_{min}$, a cyclically determined operation on the target sensing orientation can be stopped. Thus, the target sensing orientation can be accurately and effectively determined. In some embodiments, the iterative calculation can include, for example, the first orientation being rotated $\Delta\varphi$ to be used as the center orientation. An FOV direction $\vec{f}'$ after three-dimensional rotation is calculated according to $\Delta\varphi$ is represented by:

$$\vec{f}' = \cos(\Delta\varphi)\cdot\vec{f} + \sin(\Delta\varphi)\cdot\vec{f_\perp}$$

where, $\vec{f}'$ denotes the FOV direction corresponding to the center orientation, $\Delta\varphi$ denotes the angle that the first orientation needs to rotate to reach the center orientation, $\vec{f}$ is the FOV direction corresponding to the first orientation, and $\vec{f_\perp}$ denotes an auxiliary vector that is coplanar with $\vec{f}$ and $\vec{p}$ and can be calculated by:

$$\vec{f_\perp} = \frac{\vec{f}\times\vec{p}\times\vec{f}}{\|\vec{f}\times\vec{p}\times\vec{f}\|}$$

The angle of the FOV can remain unchanged. Then, whether all previous trajectory points are within the auxiliary FOV $\vec{f}'$ range corresponding to the center orientation can be determined. If the trajectory points are within the auxiliary FOV $\vec{f}'$ range, $$\Delta\varphi = \Delta\varphi + \frac{\varepsilon}{2}$$

is updated, where $\varepsilon$ is the preset orientation adjustment parameter. If any previous trajectory point is not within the auxiliary FOV $\vec{f}'$ range, $$\Delta\varphi = \Delta\varphi - \frac{\varepsilon}{2}$$

can be updated. When the orientation of the camera apparatus is adjusted, a change amplitude in orientation adjustment may not be limited to $$\frac{\varepsilon}{2},$$

and can be 0.18, 0.28, 0.58, 8, 28, etc. Those skilled in the art can select different adjustment amplitudes according to the application scenarios and application requirements, which are not repeated here.

Then, a new $\Delta\varphi$ can be used to repeat the calculation until the precision requirement $\varepsilon\leq\varepsilon_{min}$ is satisfied, or $\Delta\varphi$ exceeds the range requirement $[\mathbf{0}, \Delta\varphi_{max}]$, where $\Delta\varphi_{max}=\theta-\varphi/2$.

By repeating the above process, the target sensing orientation of the sensing apparatus corresponding to the route of the UAV can be obtained. During the iterative calculation of the target sensing orientation, if the calculated result $\Delta\varphi$ is not equal to $\Delta\varphi_{max}$, the trajectory point cannot be included in the FOV in the iteration result of the frame. That is, with the iteration result, as many trajectory points as possible can be observed or sensed. Then, the iterative calculation can be stopped, and the target sensing orientation can be determined. In some other embodiments, after traversing all the trajectory points, one target sensing orientation can be determined, and all the trajectory points can be observed or sensed in the target sensing orientation.

In some embodiments, if the task requires the camera apparatus to ensure that the heading is biased as much as possible towards the last point of the trajectory, the calculation for the last point may need to be based on $\Delta\varphi_{max}=\theta$. The initial precision $\varepsilon=\Delta\varphi_{max}$, and the rotation angle $\Delta\varphi=\Delta\varphi_{max}$. This is, all the trajectory points can be included in the target sensing orientation, and the target sensing orientation can face the end point of the trajectory as much as possible. That is, the center line of the FOV range corresponding to the target sensing orientation can be aligned with the end point of the trajectory. Thus, the stability and reliability of the operation of the UAV can be improved.

Process 6, the sensing orientation of the camera apparatus is adjusted to the target sensing orientation.

In some other embodiments, during the process of determining the target sensing orientation, corresponding limitation conditions can be added or reduced according to different design requirements or user needs. For example, the heading needs to face the last point of the trajectory as much as possible, or the heading needs to remain unchanged as much as possible.

In the technical solution of embodiments of the present disclosure, the heading of the camera apparatus can be planned without joystick guidance and target body guidance and only with the predicted landmarks of the flight. Moreover, in the planned heading, as many landmarks or trajectory points as possible can be observed or sensed. Thus, the trajectory that is about to be executed can obtain or use more front views or photographed images. Additionally, under the condition of being able to observe or sense as many landmarks or trajectory points as possible, the planned heading can be biased towards the endpoint of the trajectory. When the endpoint is approached, the heading may not be changed due to a small change in the trajectory. Thus, the heading calculation can have a certain disturbance resistance for the trajectory change. The calculated heading can maintain a certain stability with a small change in the trajectory. Thus, the heading calculation can have a certain disturbance resistance for the trajectory change. Then, the safety of the task execution can be improved, and more task information can be provided to the user by controlling the orientation of the camera apparatus. Thus, the user experience can be improved, and the applicability of the method can be further improved, which facilitates the promotion and application in the market.

Figure 16:
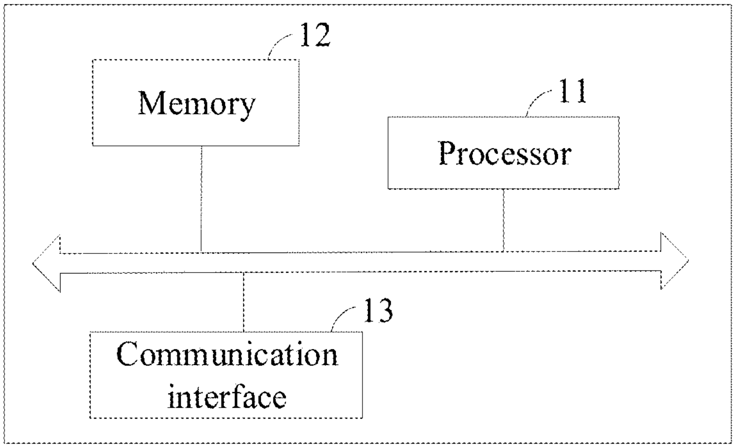
FIG. 16 is a schematic structural diagram of a control apparatus of a movable platform consistent with an embodiment of the present disclosure.

FIG. 16 is a schematic structural diagram of a control apparatus of a movable platform consistent with an embodiment of the present disclosure. As shown in FIG. 16, embodiments of the present disclosure provide the control apparatus for the movable platform. The movable platform can include the UAV, unmanned vehicle, unmanned ship, movable robot, etc. The movable platform can include the sensing apparatus configured to sense the surrounding environment of the movable platform. The sensing apparatus can include at least one of a camera apparatus, distance sensor, Lidar, or depth sensor. Those skilled in the art can select the corresponding sensing apparatus according to the application scenarios of application requirements. In addition, the control apparatus of the movable platform can be configured to execute the method for controlling the movable platform shown in FIG. 4. In some embodiments, the control apparatus of the movable platform includes a memory 12 and a processor 11.

The memory 12 can be used to store a computer program.

The processor 11 can be configured to execute the computer program stored in memory 12 to obtain the trajectory of the movable platform, control the movable platform to move along the trajectory, during the movement of the movable platform along the trajectory, determine the target sensing orientation of the sensing apparatus, and adjust the sensing orientation of the sensing apparatus to the target sensing orientation.

If the sensing orientation of the sensing apparatus of the movable platform at the current location is the target sensing orientation, the N consecutive trajectory points starting from the current location of the trajectory can be within the characteristic sensing range of the sensing apparatus, and the (N+1)-th trajectory point can be outside the characteristic sensing range. The target sensing orientation can be determined based on the locations of the N+1 trajectory points.

The electronic device can also include a communication interface 13 configured for the communication between the electronic device and other devices or communication networks.

In some embodiments, the trajectory can be a return trajectory determined according to the return points of the movable platform.

In some embodiments, when obtaining the trajectory of the movable platform, the processor 11 can be configured to obtain the trajectory sent by the control terminal. The trajectory can be determined by the control terminal detecting the user trajectory editing.

In some embodiments, the sensing apparatus can include the camera apparatus.

In some embodiments, the processor 11 can be further configured to send the image collected by the camera apparatus to the control terminal through the wireless communication link to cause the control terminal to display the image.

In some embodiments, the sensing apparatus can include the distance sensor. The processor 11 can be further configured to obtain distance data collected by the distance sensor and control the movable platform to avoid the obstacle on the trajectory according to the distance data.

In some embodiments, the trajectory points can be location points obtained by sampling the trajectory.

In some embodiments, when determining the target sensing orientation of the sensing apparatus, the processor 11 can be configured to determine the reference sensing orientation of the sensing apparatus corresponding to the N trajectory points. When the sensing orientation of the sensing apparatus of the movable platform at the current location is the reference sensing orientation, the N consecutive trajectory points starting from the current location of the trajectory can be within the characteristic sensing range of the sensing apparatus. The reference sensing orientation can be determined based on the locations of the N trajectory points. The processor 11 can be further configured to determine whether the (N+1)-th trajectory point is within the characteristic sensing range of the sensing apparatus corresponding to the reference sensing orientation according to the location of the (N+1)-th trajectory point, and in response to the (N+1)-th trajectory point being not within the characteristic sensing range of the sensing apparatus corresponding to the reference sensing orientation, determine a candidate sensing orientation corresponding to the (N+1)-th trajectory point according to the reference sensing orientation and the location of the (N+1)-th trajectory point. When the sensing orientation of the sensing apparatus of the movable platform at the current location is the candidate sensing orientation, the (N+1)-th trajectory point can be within the characteristic sensing range of the sensing apparatus. The processor 11 can be further configured to in response to the N consecutive trajectory points being partially within the characteristic sensing range of the sensing apparatus corresponding to the candidate sensing orientation, determine the target sensing orientation based on the reference sensing orientation.

In some embodiments, when determining the reference sensing orientation of the sensing apparatus corresponding to the N trajectory points, the processor 11 can be configured to determine the reference sensing orientation of the sensing apparatus corresponding to the N−1 trajectory points. When the sensing orientation of the sensing apparatus of the movable platform at the current location is the reference sensing orientation corresponding to the N−1 trajectory points, the N−1 consecutive trajectory points that have not been reached starting from the current location of the trajectory can be within the characteristic sensing range of the sensing apparatus. The reference sensing orientation corresponding to the N−1 trajectory points can be determined according to the locations of the N−1 trajectory points. The processor 11 can be further configured to determine whether the N-th trajectory point is within the characteristic sensing range of the sensing apparatus corresponding to the reference sensing orientation according to the location of the N-th trajectory point, and in response to the N-th trajectory point being not within the characteristic sensing range of the sensing apparatus corresponding to the reference sensing orientation, determine the candidate sensing orientation corresponding to the N-th trajectory point according to the reference sensing orientation corresponding to the N−1 trajectory points and the locations of the N-th trajectory point. When the sensing orientation of the sensing apparatus of the movable platform at the current location is the candidate sensing orientation, the N-th trajectory point can be within the characteristic sensing range of the sensing apparatus, in response to the N−1 consecutive trajectory points being within the characteristic sensing range of the sensing apparatus corresponding to the candidate sensing orientation, determine the candidate sensing orientation corresponding to the N-th trajectory point as the reference sensing orientation of the sensing apparatus corresponding to the N trajectory points, and in response to the N-th trajectory point being within the characteristic sensing range of the sensing apparatus corresponding to the reference sensing orientation, determine the reference sensing orientation of the sensing apparatus corresponding to N−1 trajectory points as the reference sensing orientation of the sensing apparatus corresponding to the N trajectory points.

In some embodiments, when determining the target sensing orientation according to the reference sensing orientation, the processor 11 can be configured to determine the reference sensing orientation as the target sensing orientation.

In some embodiments, when determining the target sensing orientation according to the reference sensing orientation, the processor 11 can be configured to determine the target sensing orientation according to the reference sensing orientation and the candidate sensing orientation.

In some embodiments, when determining the target sensing orientation according to the reference sensing orientation and the candidate sensing orientation, the processor 11 can be configured to determine the intermediate sensing orientation between the reference sensing orientation and the candidate sensing orientation according to the reference sensing orientation and the candidate sensing orientation, determine whether the N trajectory points are within the characteristic sensing range of the sensing apparatus of the movable platform at the current location that is the intermediate sensing orientation according to the locations of N trajectory points, if yes, determine the target sensing orientation according to the intermediate sensing orientation and the candidate sensing orientation, if not, determine the target sensing orientation according to the intermediate sensing orientation and the reference sensing orientation.

In some embodiments, the characteristic sensing range of the sensing apparatus can be less than or equal to the actual sensing range of the sensing apparatus.

The apparatus shown in FIG. 16 is configured to execute the methods of embodiments shown in FIGS. 4 to 15. For parts not detailed here, reference can be made to the relevant description of embodiments shown in FIGS. 4 to 15. The execution process and technical effects of the technical solution can be referred to the descriptions of embodiments shown in FIGS. 4 to 15, which are not repeated here.

Figure 17:
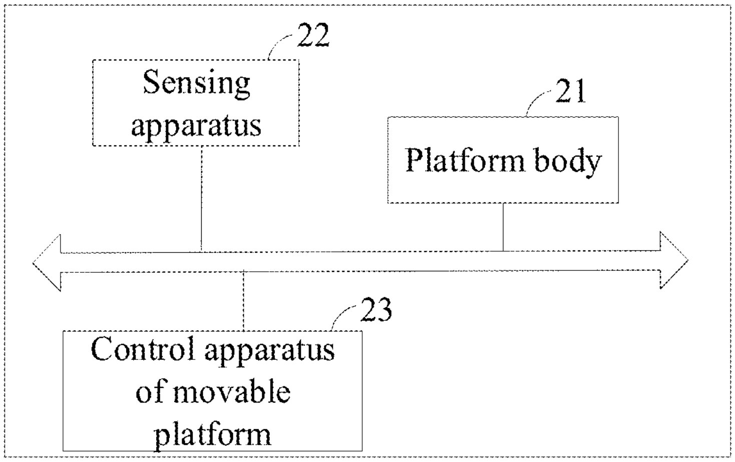
FIG. 17 is a schematic structural diagram of a movable platform consistent with an embodiment of the present disclosure.

FIG. 17 is a schematic structural diagram of a movable platform consistent with an embodiment of the present disclosure. As shown in FIG. 17, embodiments of the present disclosure provide a movable platform. The movable platform includes a platform body 21, a sensing apparatus 22, and the control apparatus 23 of the movable platform shown in FIG. 16.

The sensing apparatus 22 can be arranged at the platform body 21 and configured to detect the surrounding environment of the movable platform.

The implementation principle and technical effects of a gimbal of embodiments of the present disclosure can be similar to the implementation principle and the technical effects of the control apparatus of the movable platform. For details, reference can be made to embodiments shown in FIG. 16, which is not repeated here.

In addition, embodiments of the present disclosure provide a computer-readable storage medium. The storage medium can be a computer-readable storage medium. The computer-readable storage medium can store program instructions used to implement the methods for controlling the movable platform as shown in FIGS. 4 to 15.

The technical solutions and features of embodiments of the present disclosure can be independently implemented or combined with each other when there is no conflict. As long as the technical solutions and features do not exceed the scope of those skilled in the art, the technical solutions and features are all within the scope of the present disclosure.

In embodiments of the present disclosure, the related sensing apparatuses and methods can be implemented in other methods. For example, the above detection apparatus embodiments are merely illustrative. The division of the modules or units is only a logical function division. Actual implementations can have other division methods. For example, a plurality of units or assemblies can be combined or integrated into another system, or some features may be ignored or not executed. Moreover, the coupling, direct coupling, or communicative connection that is displayed or discussed can be indirect coupling or communicative connection through some interfaces, detection apparatuses, or units and can be electrical, mechanical, etc.

The units described as separate components may or may not be physically separated, and the components shown as units may or may not be physical units. That is, the units can be located at one place or distributed to a plurality of network units. A part or all of the units can be selected according to actual needs to achieve the purposes of embodiments of the present disclosure.

Furthermore, the functional units of embodiments of the present disclosure can be integrated into one processing unit or may be physically separated into individual units, or two or more units can be integrated into one unit. The integrated units can be implemented in hardware or can be implemented in the form of software functional units.

When the integrated unit is implemented in the form of the software functional unit and sold or used as a separate product, the integrated unit can be stored in a computer-readable storage medium. Based on this understanding, the essence of the technical solutions of the present disclosure or the part of the technical solutions of the present disclosure makes contributions to the existing technology, or all or a part of the technical solution can be embodied in the form of the software product. The computer software product can be stored in a storage medium, including several instructions used to cause the processor to execute all or some steps of the method of embodiments of the present disclosure. The storage medium can include a medium that can store program codes, such as USB flash drives, mobile hard drives, read-only memory (ROM), random access memory (RAM), disks, CDs, etc.

The above are only embodiments of the present disclosure and do not limit the scope of the present disclosure. All equivalent structures or equivalent process modifications made according to the specification and accompanying drawings of the present disclosure, or other related technical fields directly or indirectly using the specification and accompanying drawings are within the scope of the present disclosure.

The above embodiments are merely used to describe the technical solutions of the present disclosure and not limit the present disclosure. Although the present disclosure is described in detail according to the above embodiments, those skilled in the art can still make modifications to the technical solutions recorded in the above embodiments, or perform equivalent replacement on some or all technical features. These modifications and replacements do not cause the essence of the technical solution to depart from the scope of the present disclosure.

What is claimed is:

1. A method for controlling a movable platform comprising:

obtaining a trajectory of the movable platform and controlling the movable platform to move along the trajectory, the trajectory including a plurality of trajectory points;

obtaining a reference sensing orientation of a sensing apparatus of the movable platform, N trajectory points after a current location of the movable platform being within a sensing range of the sensing apparatus with the reference sensing orientation, and an (N+1)-th trajectory point after the current location of the movable platform being not within the sensing range of the sensing apparatus with the reference sensing orientation; and adjusting the sensing orientation of the sensing apparatus from the reference sensing orientation to a target sensing orientation, M trajectory points after the current location of the movable platform being within a sensing range of the sensing apparatus with the target sensing orientation, and an (M+1)-th trajectory point after the current location of the movable platform being not within the sensing range of the sensing apparatus with the target sensing orientation, such that when the (M+1)-th trajectory point after the current location is within the sensing range of the sensing apparatus with a sensing orientation, at least one trajectory point from the current location to an M-th trajectory point after the current location is not within the sensing range of the sensing apparatus with the sensing orientation, and M is greater than N.

2. The method according to claim 1, wherein:

the M trajectory points are two or more of the plurality of trajectory points that the movable platform is to reach within a certain time length starting from the current location.

3. The method according to claim 1, wherein the target sensing orientation is determined to maximize a number of trajectory points, that the sensing apparatus is capable of sensing within the sensing range, on a trajectory segment between the current location and a location that the movable platform is about to reach in a certain time length.

4. The method according to claim 1, wherein when the sensing orientation of the sensing apparatus is the target sensing orientation, a center line of the sensing range of the sensing apparatus does not align with a tangent direction of the trajectory at the current location.

5. The method according to claim 1, wherein when the sensing orientation of the sensing apparatus is the target sensing orientation, a center line of the sensing range of the sensing apparatus does not align with a direction of a current velocity of the movable platform.

6. The method according to claim 1, wherein the target sensing orientation is calculated according to an iterative algorithm.

7. The method according to claim 1, wherein the trajectory is a return trajectory determined according to a return point of the movable platform.

8. The method according to claim 1, wherein obtaining the trajectory of the movable platform includes:

obtaining the trajectory sent by a control terminal, the trajectory being determined by the control terminal detecting user trajectory edition.

9. The method according to claim 1, wherein the sensing apparatus includes a camera apparatus.

10. The method according to claim 1, wherein the plurality of trajectory points are location points obtained by sampling the trajectory.

11. The method according to claim 1, further comprising:

determining the reference sensing orientation of the sensing apparatus corresponding to the N trajectory points;

determining, according to a location of the (N+1)-th trajectory point, whether the (N+1)-th trajectory point is within the sensing range of the sensing apparatus with the reference sensing orientation;

in response to the (N+1)-th trajectory points being not within the sensing range of the sensing apparatus with the reference sensing orientation, determining a candidate sensing orientation corresponding to the (N+1)-th trajectory point according to the reference sensing orientation and the location of the (N+1)-th trajectory point, such that when the sensing orientation of the sensing apparatus of the movable platform at the current location is the candidate sensing orientation, the (N+1)-th trajectory point is in the sensing range of the sensing apparatus.

12. The method according to claim 11, wherein determining the reference sensing orientation of the sensing apparatus corresponding to the N trajectory points includes:

determining the reference sensing orientation of the sensing apparatus corresponding to N−1 trajectory points, that the movable platform has not reached, on the segment of the trajectory starting from the current location according to locations of the N−1 trajectory points, such that when the sensing orientation of the sensing apparatus of the movable platform at the current location is the reference sensing orientation corresponding to the N−1 trajectory points, the N−1 trajectory points are within the sensing range of the sensing apparatus;

determining, according to a location of the N-th trajectory point, whether the N-th trajectory point is within the sensing range of the sensing apparatus corresponding to the reference sensing orientation;

in response to the N-th trajectory point being not within the characteristic sensing range of the sensing apparatus corresponding to the reference sensing orientation, determining a candidate sensing orientation corresponding to the N-th trajectory point according to the reference sensing orientation and the location of the N-th trajectory point, such that when the sensing orientation of the sensing apparatus of the movable platform at the current location is the candidate sensing orientation corresponding to the N-th trajectory point, the N-th trajectory point is within the sensing range of the sensing apparatus;

in response to the N−1 trajectory points being within the sensing range of the sensing apparatus corresponding to the candidate sensing orientation corresponding to the N-th trajectory point, determining the candidate sensing orientation corresponding to the N-th trajectory point as the reference sensing orientation of the sensing apparatus corresponding to the N trajectory points; and in response to the N-th trajectory point being within the sensing range of the sensing apparatus corresponding to the reference sensing orientation, determining the reference sensing orientation of the sensing apparatus corresponding to the N−1 trajectory points as the reference sensing orientation of the sensing apparatus corresponding to the N trajectory points.

13. The method according to claim 11, further comprising:

determining the target sensing orientation according to the reference sensing orientation and the candidate sensing orientation corresponding to the (N+1)-th trajectory point.

14. The method according to claim 13, wherein determining the target sensing orientation according to the reference sensing orientation and the candidate sensing orientation corresponding to the (N+1)-th trajectory point includes:

determining an intermediate sensing orientation between the reference sensing orientation and the candidate sensing orientation corresponding to the (N+1)-th trajectory point according to the reference sensing orientation and the candidate sensing orientation corresponding to the (N+1)-th trajectory point;

determining, according to the locations of the N trajectory points, whether the N trajectory points are within the sensing range of the sensing apparatus when the movable platform is at the current location and the sensing orientation of the sensing apparatus is the intermediate sensing orientation;

in response to the N trajectory points being in the sensing range of the sensing apparatus when the movable platform is at the current location and the sensing orientation of the sensing apparatus is the intermediate sensing orientation, determining the target sensing orientation according to the intermediate sensing orientation and the candidate sensing orientation corresponding to the (N+1)-th trajectory point; and in response to the N trajectory points being not in the sensing range of the sensing apparatus when the movable platform is at the current location and the sensing orientation of the sensing apparatus is the intermediate sensing orientation, determining the target sensing orientation according to the intermediate sensing orientation and the reference sensing orientation.

15. The method according to claim 1, wherein the sensing range of the sensing apparatus is smaller than or equal to an actual sensing range of the sensing apparatus.

16. A control apparatus of a movable platform comprising:

one or more processors; and one or more memories storing one or more computer programs that, when executed by the one or more processors, cause the one or more processors to:

obtain a trajectory of the movable platform and control the movable platform to move along the trajectory, the trajectory including a plurality of trajectory points;

obtain a reference sensing orientation of a sensing apparatus of the movable platform, N trajectory points after a current location of the movable platform being within a sensing range of the sensing apparatus with the reference sensing orientation, and an (N+1)-th trajectory point after the current location of the movable platform being not within the sensing range of the sensing apparatus with the reference sensing orientation; and adjust the sensing orientation of the sensing apparatus from the reference sensing orientation to a target sensing orientation, M trajectory points after the current location of the movable platform being within a sensing range of the sensing apparatus with the target sensing orientation, and an (M+1)-th trajectory point after the current location of the movable platform being not within the sensing range of the sensing apparatus with the target sensing orientation, such that when the (M+1)-th trajectory point after the current location is within the sensing range of the sensing apparatus with a sensing orientation, the sensing range of the sensing apparatus with the sensing orientation at least one trajectory point from the current location to an M-th trajectory point after the current location is not within the sensing range of the sensing apparatus with the sensing orientation, and M is greater than N.

17. A method for controlling a movable platform comprising:

obtaining a trajectory of the movable platform and controlling the movable platform to move along the trajectory;

obtaining a reference sensing orientation of a sensing apparatus of the movable platform, wherein when a sensing orientation of the sensing apparatus is the reference sensing orientation, first one or more trajectory points between a current location of the movable platform and a first location are within a sensing range of the sensing apparatus, and second one or more trajectory points after the first location are outside the sensing range of the sensing apparatus;

determining a target sensing orientation of the sensing apparatus, including:

determining the reference sensing orientation of the sensing apparatus corresponding to N consecutive trajectory points, that the movable platform has not reached, on a segment of the trajectory starting from the current location according to locations of the N consecutive trajectory points, wherein when the sensing orientation of the sensing apparatus of the movable platform at the current location is the reference sensing orientation, the N consecutive trajectory points are within a characteristic sensing range of the sensing apparatus;

determining, according to a location of an (N+1)-th trajectory point, whether the (N+1)-th trajectory point is within the characteristic sensing range of the sensing apparatus corresponding to the reference sensing orientation;

in response to the (N+1)-th trajectory points being not within the characteristic sensing range of the sensing apparatus corresponding to the reference sensing orientation, determining a candidate sensing orientation corresponding to the (N+1)-th trajectory point according to the reference sensing orientation and the location of the (N+1)-th trajectory point, such that when the sensing orientation of the sensing apparatus of the movable platform at the current location is the candidate sensing orientation, the (N+1)-th trajectory point is in the characteristic sensing range of the sensing apparatus; and in response to the N consecutive trajectory points being partially within the characteristic sensing range of the sensing apparatus corresponding to the candidate sensing orientation, determining the target sensing orientation according to the reference sensing orientation; and adjusting the sensing orientation of the sensing apparatus from the reference sensing orientation to the target sensing orientation, wherein when the sensing orientation of the sensing apparatus is the target sensing orientation, the first one or more trajectory points and the second one or more trajectory points are within the sensing range of the sensing apparatus.

* * * * *